US012574167B2

(12) United States Patent (10) Patent No.: US 12,574,167 B2
Zhang et al. (45) Date of Patent: Mar. 10, 2026

(54) TRANSMITTING AND RECEIVING SIDELINK REFERENCE SIGNAL

(71) Applicant: 1FINITY Inc., Kawasaki (JP)

(72) Inventors: Jian Zhang, Beijing (CN); Pengyu Ji, Beijing (CN); Guorong Li, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 625 days.

(21) Appl. No.: 17/198,641

(22) Filed: Mar. 11, 2021

(65) Prior Publication Data

US 2021/0203455 A1     Jul. 1, 2021

Related U.S. Application Data

(63) Continuation of application No. PCT/CN2018/108012, filed on Sep. 27, 2018.

(51) Int. Cl.
H04L 1/1867     (2023.01)
H04L 5/00     (2006.01)
(Continued)

(52) U.S. Cl.
CPC .......... *H04L 1/1893* (2013.01); *H04L 5/0057* (2013.01); *H04W 56/001* (2013.01); *H04W 72/0446* (2013.01)

(58) Field of Classification Search
CPC .. H04L 1/1893; H04L 5/0057; H04W 56/001; H04W 72/0446
See application file for complete search history.

(56) References Cited

U.S. PATENT DOCUMENTS

2012/0170680 A1*  7/2012  Stern ..................... H04L 5/0039
                                                      375/299
2017/0013577 A1    1/2017  Berggren
(Continued)

FOREIGN PATENT DOCUMENTS

CN        105659675 A     6/2016
CN        107071796 A     8/2017
(Continued)

OTHER PUBLICATIONS

International Search Report and Written Opinion of the International Searching Authority issued by the China National Intellectual Property Administration for corresponding International Patent Application No. PCT/CN2018/108012, mailed on Jun. 28, 2019, with an English translation.
(Continued)

*Primary Examiner* — Jasper Kwoh
(74) *Attorney, Agent, or Firm* — Myers Wolin, LLC

(57) ABSTRACT

An apparatus for transmitting HARQ-ACK (Hybrid Automatic Repeat Request-Acknowledge) signal includes a memory and processor circuitry. The memory stores a plurality of instructions. The processor circuitry is coupled to the memory and is configured to determine a sidelink HARQ-ACK signal. The sidelink HARQ-ACK signal is carried in a first part of symbols of a time interval. The processor circuitry is further configured to transmit the sidelink HARQ-ACK signal to a second device. The time interval further comprises a third part of symbols. The third part of symbols is located in front of the first part of symbols carrying the sidelink HARQ-ACK signal, or one or more symbols in front of the first part of symbols are taken as the third part of symbols.

20 Claims, 15 Drawing Sheets

| AGC 1 Reception | Information Reception | Guard Interval 1 | AGC 2 Transmission | XRS Transmission | Guard Interval 2 |

(51) Int. Cl.
    *H04W 56/00*      (2009.01)
    *H04W 72/0446*    (2023.01)

(56)            References Cited

U.S. PATENT DOCUMENTS

| | | | |
|---|---|---|---|
| 2017/0290020 A1 | 10/2017 | Aiba et al. | |
| 2019/0124673 A1* | 4/2019 | Seo | H04L 5/0032 |
| 2020/0305176 A1* | 9/2020 | Hu | H04B 7/0626 |

FOREIGN PATENT DOCUMENTS

| | | |
|---|---|---|
| CN | 107079529 A | 8/2017 |
| WO | 2017/130592 A1 | 8/2017 |
| WO | 2017/171895 A1 | 10/2017 |
| WO | 2018/123623 A1 | 7/2018 |

OTHER PUBLICATIONS

Notice of Reasons for Refusal issued by the Japan Patent Office for corresponding Japanese Patent Application No. 2021-516374, mailed on Jan. 4, 2023, with an English translation.

First Notification of Office Action and Search Report issued by the China National Intellectual Property Administration for corresponding Chinese Patent Application No. 201880097058.9, dated May 10, 2023, with an English translation.

Notice of Reasons for Refusal issued by the Japan Patent Office for corresponding Japanese Patent Application No. 2021-516374, mailed on Jul. 5, 2022, with an English translation.

Ericsson, "Physical layer design of NR sidelink", Agenda Item: 7.2.4.1.2, 3GPP TSG-RAN WG1 Meeting #94, R1-1809302, Göteborg, Sweden, Aug. 20-24, 2018.

* cited by examiner

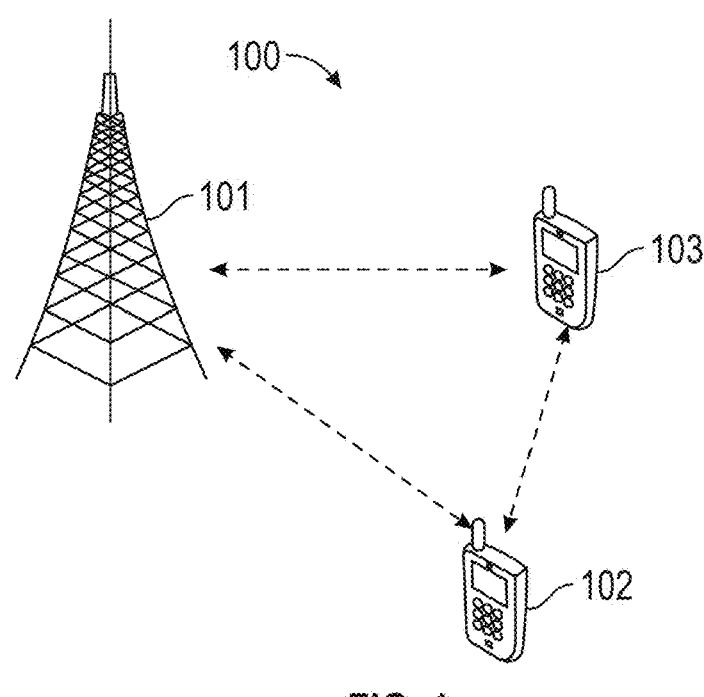
FIG. 1
201
A first device determines a sidelink reference signal used for obtaining CSI, wherein the sidelink reference signal is carried in a first part of symbols of a time interval
202
The first device transmits the sidelink reference signal to a second device
FIG. 2
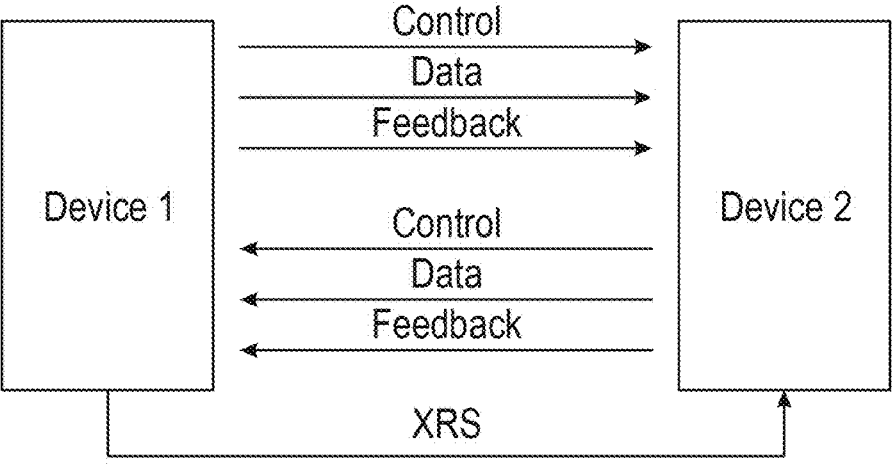
FIG. 3

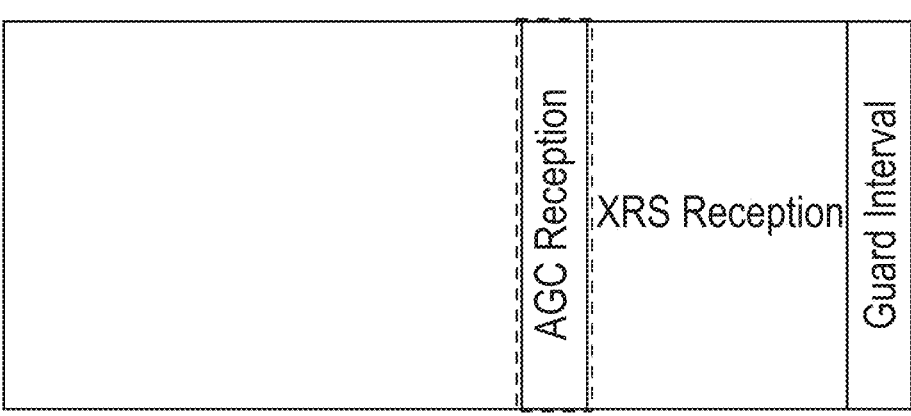
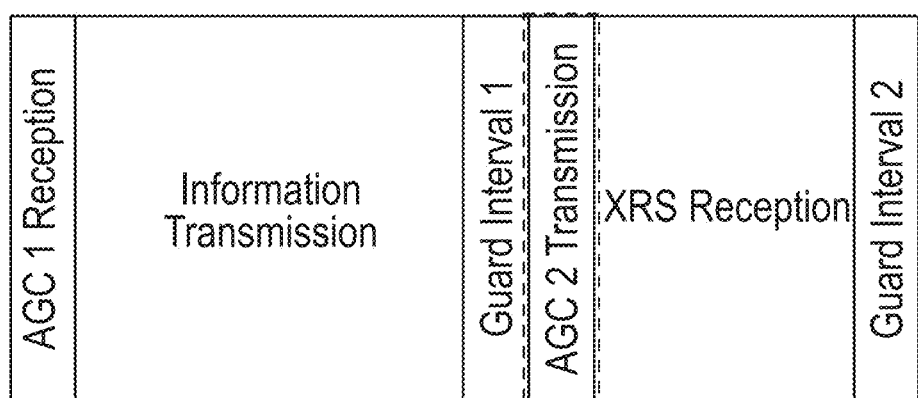
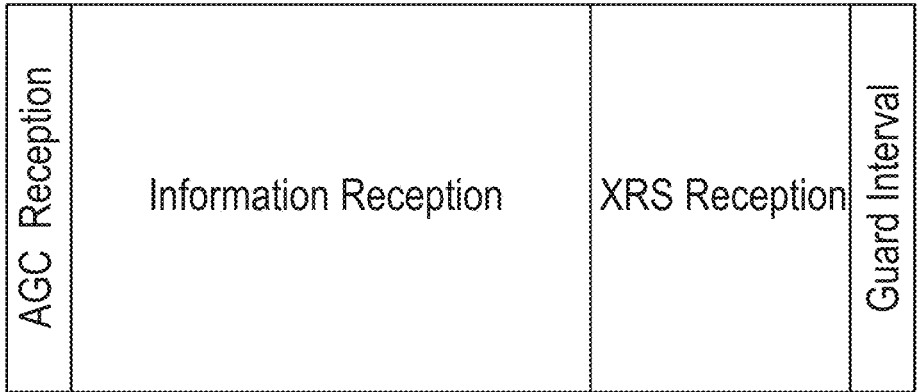
FIG. 7

FIG. 10

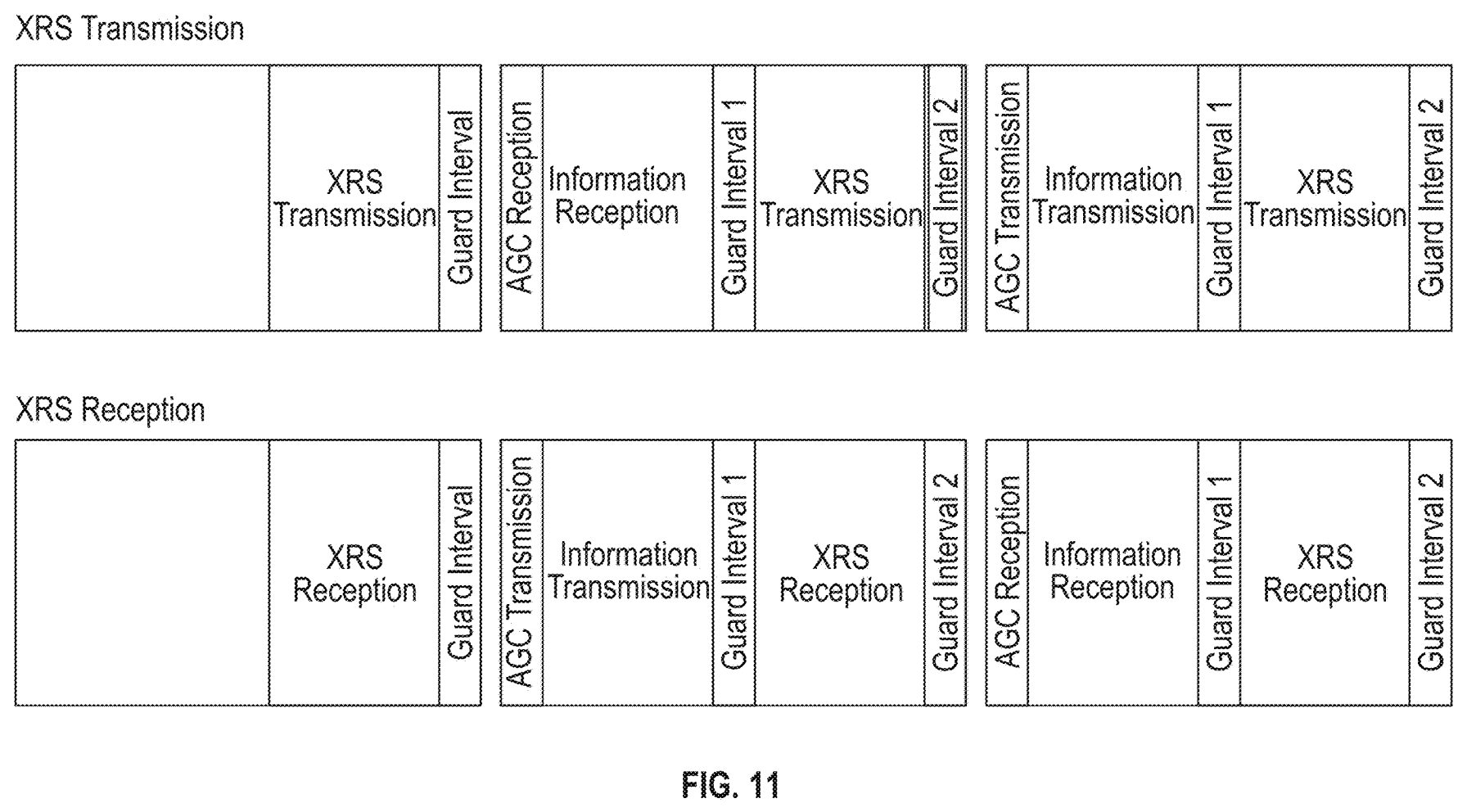

XRS Transmission

| | Guard Interval | XRS Transmission | | AGC Transmission | Information Reception | Guard Interval 1 | XRS Transmission | Guard Interval 2 | | AGC Transmission | Information Transmission | Guard Interval 1 | XRS Transmission | Guard Interval 2 |

XRS Reception

| | Guard Interval | XRS Reception | | AGC Reception | Information Transmission | Guard Interval 1 | XRS Reception | Guard Interval 2 | | AGC Reception | Information Reception | Guard Interval 1 | XRS Reception | Guard Interval 2 |

FIG. 11

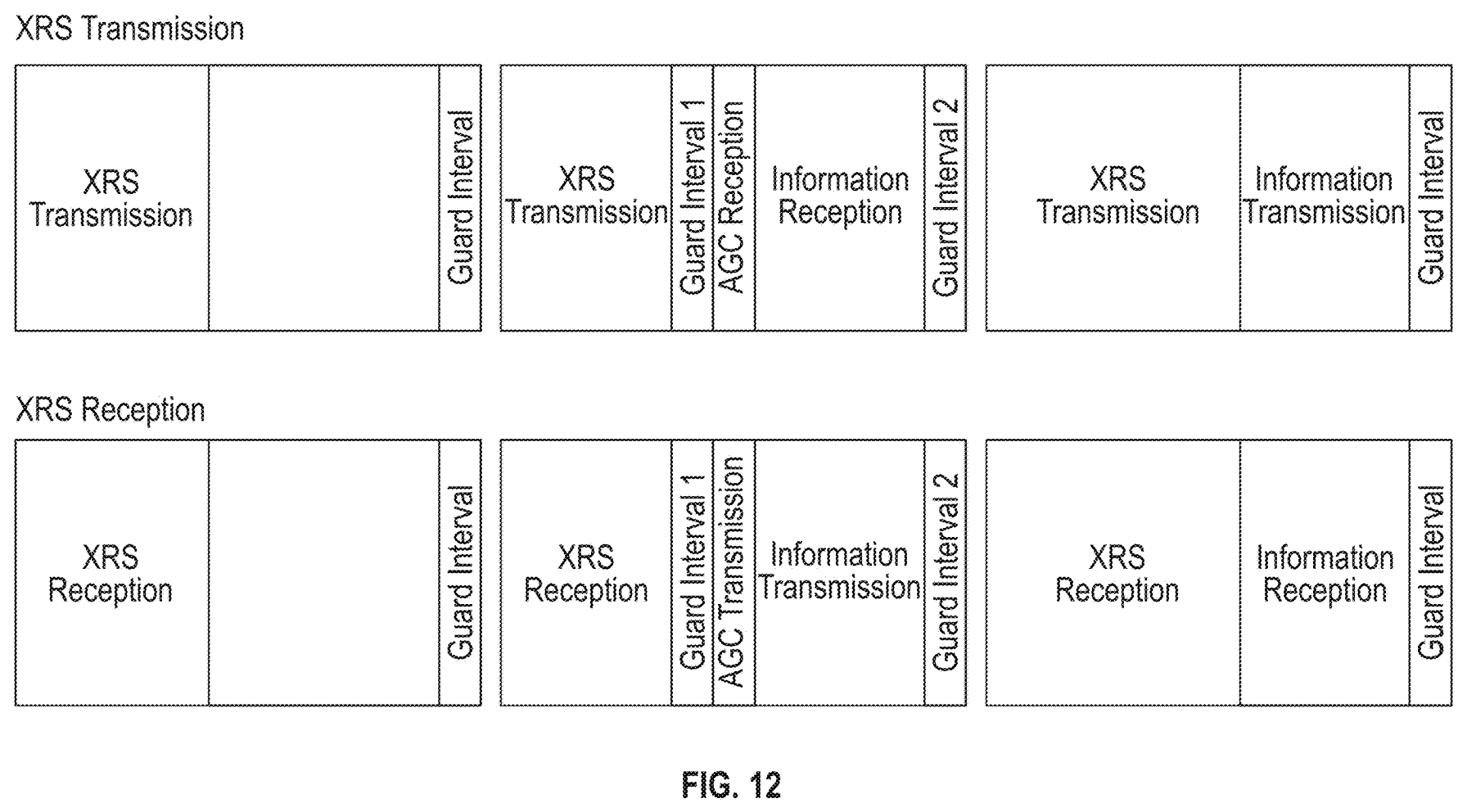

XRS Transmission

| XRS Transmission | Guard Interval | XRS Transmission | Guard Interval 1 | AGC Transmission | Information Transmission | Guard Interval 2 | XRS Transmission | Information Transmission | Guard Interval |

XRS Reception

| XRS Reception | Guard Interval | XRS Reception | Guard Interval 1 | AGC Reception | Information Reception | Guard Interval 2 | XRS Reception | Information Reception | Guard Interval |

FIG. 12

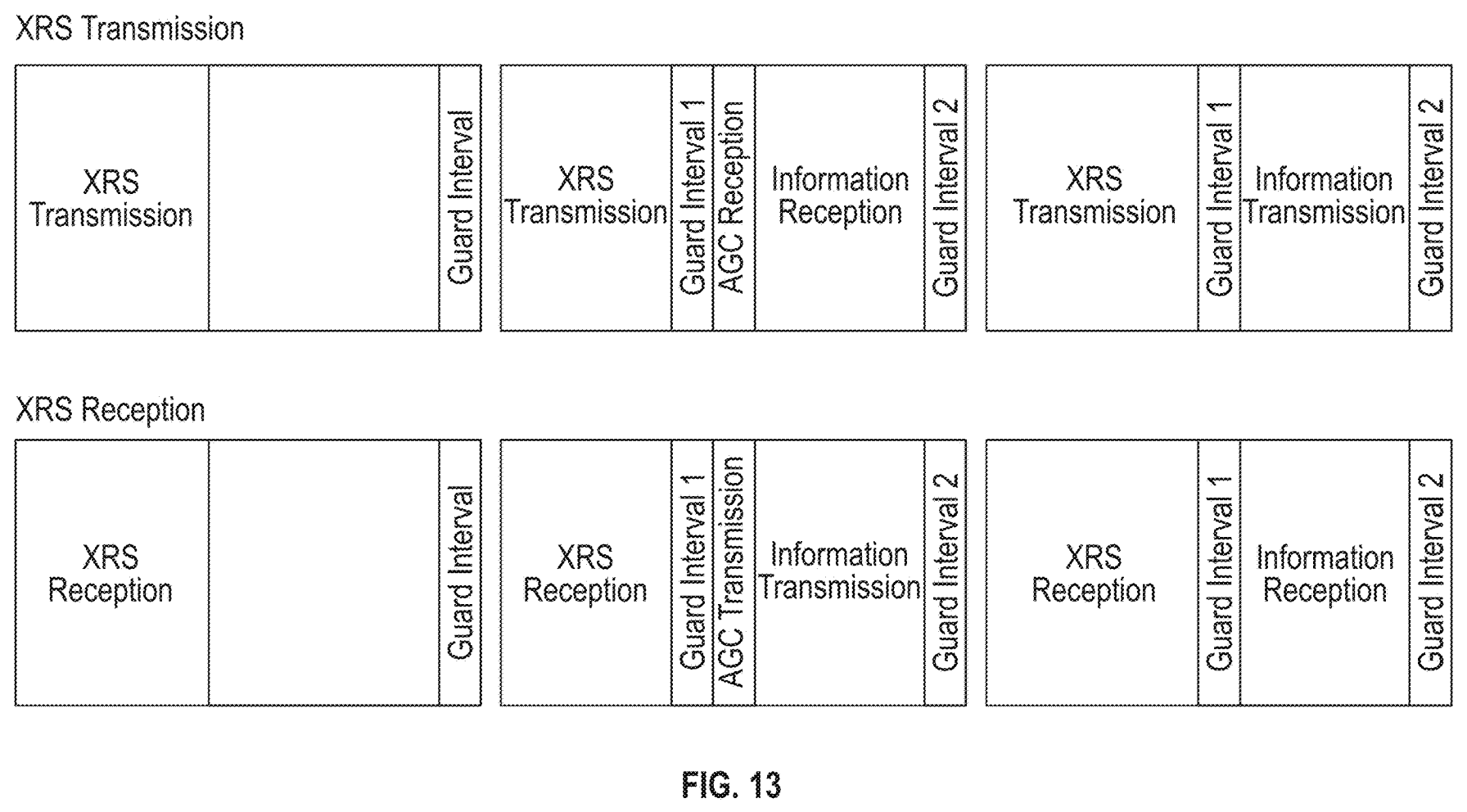

XRS Transmission

| XRS Transmission | Guard Interval | XRS Transmission | Guard Interval 1 | Information Reception | AGC Reception | Guard Interval 2 | XRS Transmission | Guard Interval 1 | Information Transmission | Guard Interval 2 |
|---|---|---|---|---|---|---|---|---|---|---|

XRS Reception

| XRS Reception | Guard Interval | XRS Reception | Guard Interval 1 | Information Transmission | AGC Transmission | Guard Interval 2 | XRS Reception | Guard Interval 1 | Information Reception | Guard Interval 2 |
|---|---|---|---|---|---|---|---|---|---|---|

FIG. 13

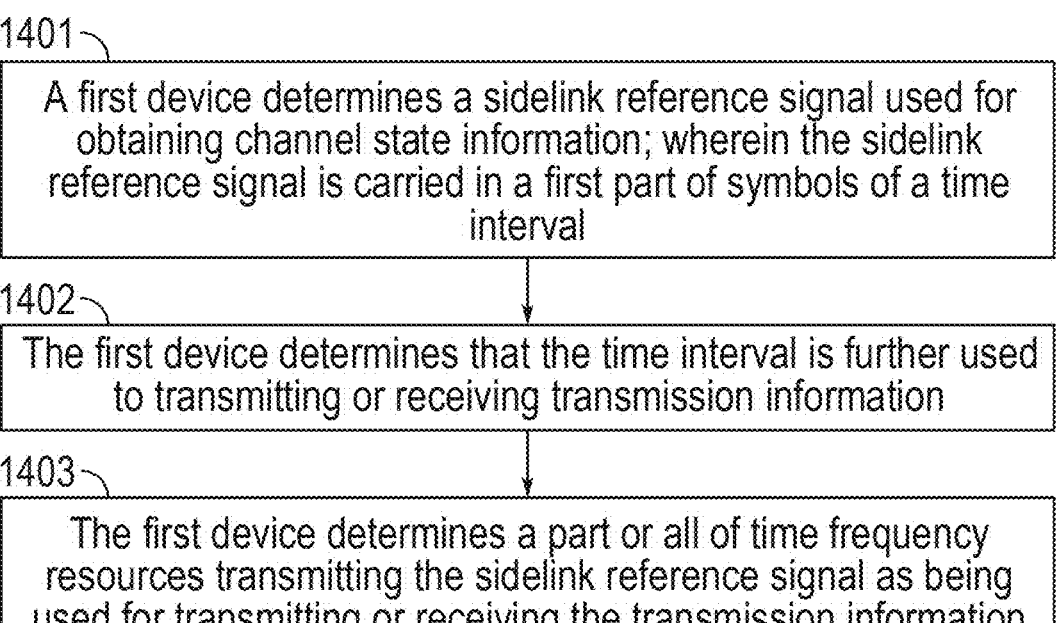

1401

A first device determines a sidelink reference signal used for obtaining channel state information; wherein the sidelink reference signal is carried in a first part of symbols of a time interval

1402

The first device determines that the time interval is further used to transmitting or receiving transmission information

1403

The first device determines a part or all of time frequency resources transmitting the sidelink reference signal as being used for transmitting or receiving the transmission information

FIG. 14

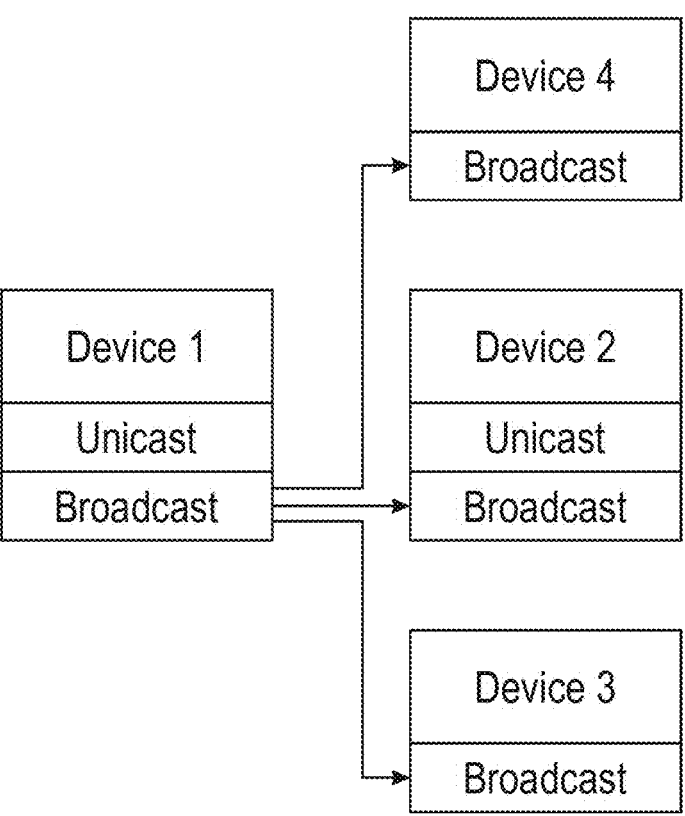

Device 4

Broadcast

Device 1

Unicast

Broadcast

Device 2

Unicast

Broadcast

Device 3

Broadcast

FIG. 15

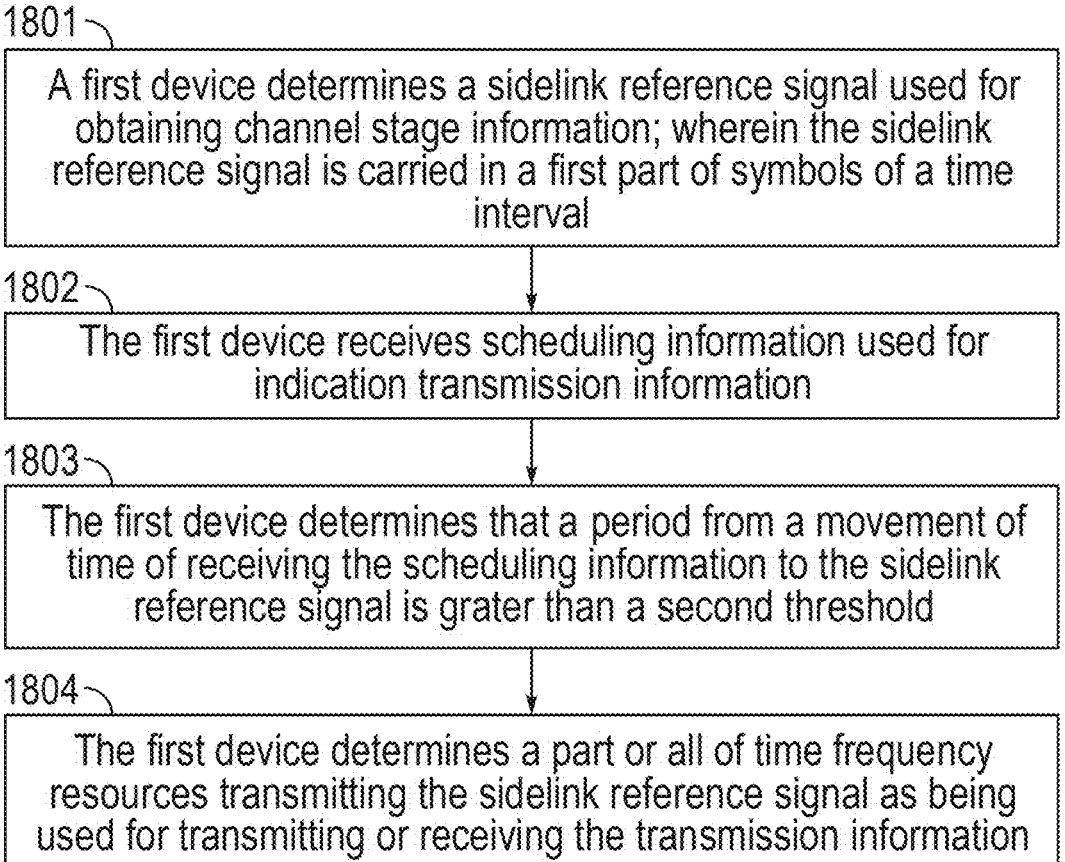

1801

A first device determines a sidelink reference signal used for obtaining channel stage information; wherein the sidelink reference signal is carried in a first part of symbols of a time interval

1802

The first device receives scheduling information used for indication transmission information

1803

The first device determines that a period from a movement of time of receiving the scheduling information to the sidelink reference signal is grater than a second threshold

1804

The first device determines a part or all of time frequency resources transmitting the sidelink reference signal as being used for transmitting or receiving the transmission information

A second device receives a sidelink reference signal transmitted by a first device; wherein the sidelink reference signal is carried in a first part of symbols of a time interval

1902

The second device performs channel measurement according to the sidelink reference signal to obtain channel state information

FIG. 19

Terminal Equipement

2340 — Input Unit

2310 — Processor

2330 — Communications Module (Transmitter/ Receiver)

2320 — Memory

- Buffer
- Application/ Function
- Data
- Program

2350 — Display

2360 — Power Supply

TRANSMITTING AND RECEIVING SIDELINK REFERENCE SIGNAL

CROSS-REFERENCE TO RELATED APPLICATION

This application is a continuation application of International Application PCT/CN2018/108012 filed on Sep. 27, 2018 and designated the U.S., the entire contents of which are incorporated herein by reference.

TECHNICAL FIELD

This disclosure relates to the field of communication technologies, and in particular to methods for transmitting and receiving a reference signal and apparatuses thereof.

BACKGROUND

Vehicle to Everything (V2X) of Long Term Evolution (LTE) is a vehicle communication technology that may realize information exchange between vehicles and vehicles, vehicles and roadside equipment, and vehicles and pedestrians.

A transmitting device in LTE V2X may directly communicate with a receiving device via a sidelink. The sidelink is a newly defined air interface for LTE V2X (i.e. an air interface between V2X devices), which corresponds to the usual cellular network Uu interface (i.e. an air interface between a network device and a terminal equipment). The sidelink may use frequency resources of the cellular network Uu interface, or may use dedicated frequency resources.

LTE V2X only supports broadcast services. For example, a transmitting device may broadcast road safety information to all surrounding receiving devices. In view of the limited role of channel state information (CSI) for broadcast services, LTE V2X provides no support for CSI measurement and reporting.

On the other hand, New Radio (NR) V2X is currently one of the research projects for Rel-16 standardization. Compared with LTE V2X, NR V2X needs to support many new scenarios and new services (such as remote driving, autonomous driving, and fleet driving, etc.), and it needs to meet higher technical indices (such as high reliability, low latency, and high data rate, etc.).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in order to meet the needs of different scenarios and different services, in addition to broadcast services, NR V2X also needs to provide support for unicast services and groupcast services. For example, two vehicle devices may exchange road condition video information by unicast, or a fleet may maintain communication between group members and the first vehicle by groupcast. Therefore, different from the case of broadcast services, CSI measurement and reporting are of great significance to unicast services and groupcast services, and may enable the transmitting device to perform link adaptation based on measurement and reporting results; for example, the transmitting device may select a modulation and coding schemes (MCSs), precoding matrix indicators (PMIs), beams, and ranks, etc., which are most adapted to a current channel, thereby facilitating realization of high data rate transmission.

However, LTE V2X only supports broadcast services. In view of the limited role of CSI on broadcast services, LTE V2X provides no support for CSI measurement and reporting. In contrast, NR V2X needs additional support for unicast services and groupcast services, and CSI is of greater significance to unicast services and groupcast services in NR V2X. Therefore, how to obtain CSI in V2X is a problem needing to be studied and solved.

In view of at least one of the above problems, embodiments of this disclosure provide methods for transmitting and receiving a reference signal and apparatuses thereof.

According to a first aspect of the embodiments of this disclosure, there is provided a method for transmitting HARQ-ACK signal, including:

> determining by a first device a sidelink HARQ-ACK signal, wherein the sidelink HARQ-ACK signal is carried in a first part of symbols of a time interval; and
> transmitting the sidelink HARQ-ACK signal by the first device to a second device.

According to a second aspect of the embodiments of this disclosure, there is provided an apparatus for transmitting HARQ-ACK signal, including:

> a memory that stores a plurality of instructions; and
> a processor coupled to the memory and configured to execute the instructions to:
> determine a sidelink HARQ-ACK signal, wherein the sidelink HARQ-ACK signal is carried in a first part of symbols of a time interval; and
> transmit the sidelink HARQ-ACK signal to a second device.

According to a third aspect of the embodiments of this disclosure, there is provided a method for receiving HARQ-ACK signal, including:

> receiving by a second device a sidelink HARQ-ACK signal transmitted by a first device;
> wherein the sidelink HARQ-ACK signal is carried in a first part of symbols of a time interval.

According to a fourth aspect of the embodiments of this disclosure, there is provided an apparatus for receiving HARQ-ACK signal, including:

> a memory that stores a plurality of instructions; and
> a processor coupled to the memory and configured to execute the instructions to:
> receive a sidelink HARQ-ACK signal transmitted by a first device; wherein the sidelink HARQ-ACK signal is carried in a first part of symbols of a time interval.

According to a fifth aspect of the embodiments of this disclosure, there is provided a communication system, including:

> a first device including the apparatus for transmitting HARQ-ACK signal as described in the second aspect; and
> a second device including the apparatus for receiving HARQ-ACK signal as described in the fourth aspect.

An advantage of the embodiments of this disclosure exists in that the sidelink reference signal (hereinafter referred to as an XRS) used for obtaining channel state information is carried in a first part of symbols of a time interval, hence, measurement and report of CSI may be support in V2X, and different scenarios and different demands for services may be satisfied.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 1 is schematic diagram of a communication system of an embodiment of this disclosure;

FIG. 2 is a schematic diagram of the method for transmitting a reference signal of an embodiment of this disclosure;

FIG. 3 is a schematic diagram of a sidelink reference signal and transmission information of the embodiment of this disclosure;

FIG. 7 is yet another exemplary diagram of the time interval carrying the sidelink reference signal of the embodiment of this disclosure;

FIG. 10 is further still another exemplary diagram of the time interval carrying the sidelink reference signal of the embodiment of this disclosure;

FIG. 11 is a yet further exemplary diagram of the time interval carrying the sidelink reference signal of the embodiment of this disclosure;

FIG. 12 is further still another exemplary diagram of the time interval carrying the sidelink reference signal of the embodiment of this disclosure;

FIG. 13 is yet further still another exemplary diagram of the time interval carrying the sidelink reference signal of the embodiment of this disclosure;

FIG. 14 is another schematic diagram of the method for transmitting a reference signal of the embodiment of this disclosure;

FIG. 15 is an exemplary diagram of transmitting multiple types of services of the embodiment of this disclosure;

FIG. 18 is a further schematic diagram of the method for transmitting a reference signal of the embodiment of this disclosure;

FIG. 19 is a schematic diagram of the method for receiving a reference signal of an embodiment of this disclosure;

DETAILED DESCRIPTION

Figure 4:
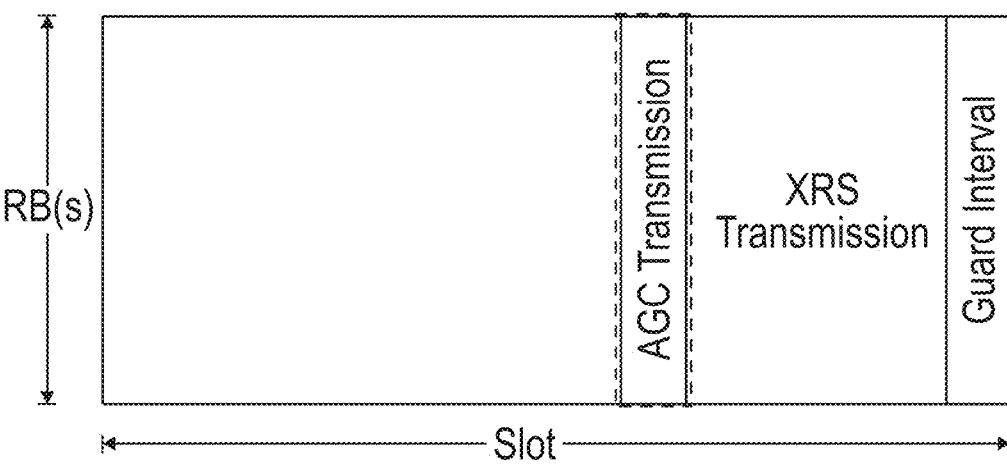
FIG. 4 is an exemplary diagram of a time interval carrying the sidelink reference signal of the embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Furthermore, the term "network side" or "network device side" refers to a side of a network, which may be a base station, or may include one or more of the above network devices. And the term "user side" or "user equipment side" refers to a side of a user or a terminal, which may be a UE, or may include one or more of the above terminal equipments.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102 and 103. For the sake of simplicity, description is given in FIG. 1 by taking two terminal equipments and one network device only as an example; however, the embodiments of this disclosure are not limited thereto.

In the embodiment of this disclosure, existing traffics or traffics that may be implemented in the future may be performed between the network device 101 and the terminal equipments 102 and 103. For example, such traffics may include but not limited to an enhanced mobile broadband (eMBB), massive machine type communication (MTC), and ultra-reliable and low-latency communication (URLLC), etc.

It should be noted that FIG. 1 shows that two terminal equipments 102 and 103 are both within a coverage of the network device 101. However, this disclosure is not limited thereto, and the two terminal equipments 102 and 103 may not be within the coverage of the network device 101, or one of the terminal equipments 102 and 103 is within the coverage of the network device 101 and the other one of the terminal equipments 102 and 103 is outside the coverage of the network device 101.

In the embodiments of this disclosure, sidelink transmission may be performed between two terminal equipments 102 and 103. For example, the two terminal equipments 102 and 103 may both perform sidelink transmission within coverage of the network device 101 to implement V2X communications, or both of them may perform sidelink transmission outside the coverage of the network device 101 to implement V2X communications, and it may also be that one of the terminal equipments 102 and 103 is within the coverage of the network device 101 and the other one of the terminal equipments 102 and 103 is outside the coverage of the network device 101 and perform sidelink transmission to implement V2X communications.

The embodiments of this disclosure shall be described by taking a sidelink and V2X as examples; however, this disclosure is not limited thereto.

Embodiment 1

The embodiments of this disclosure provide a method for transmitting a reference signal, which shall be described from a transmitting device (also referred to as a first device). The transmitting device may be a terminal equipment; however, this disclosure is not limited thereto; for example, it may also be a roadside device or a network device.

In the embodiments of this disclosure, AGC symbols and/or guard intervals may be reserved before a sidelink reference signal, or the reference signal may be used as an AGC training signal, or the reference signal may be transmitted by using a flexible slot format of NR Uu; however, this disclosure is not limited thereto. Hence, accuracy of CSI measurement may be improved, flexible multiplexing of reference signals and other information may be supported, resource sharing between sidelink and NR Uu may be supported, and spectrum utilization of sidelink may be improved.

FIG. 2 is a schematic diagram of the method for transmitting a reference signal of the embodiment of this disclosure. As shown in FIG. 2, the method includes:

step 201: a first device determines a sidelink reference signal used for obtaining CSI, wherein the sidelink reference signal is carried in a first part of symbols (one or more) of a time interval; and step 202: the first device transmits the sidelink reference signal to a second device.

In an embodiment, the time interval may include at least one of the following: a slot, a subframe, a frame, a non-slot, and a mini-slot; however, this disclosure is not limited thereto. Following description shall be given by taking a slot as an example.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

In addition, the "determining" in step 201 may refer to preconfiguring according to configuration information, or pre-determining according to indication information, and may be understood as that the sidelink reference signal has been allocated with resources but has not been transmitted; however, this disclosure is not limited thereto.

FIG. 3 is a schematic diagram of the sidelink reference signal (XRS) and transmission information of the embodiment of this disclosure. The transmission information (also referred to as information in brief) may include at least one of the following: control information, data information, and feedback information; however, this disclosure is not limited thereto.

For example, considering the unicast scenario in FIG. 3, device 1 may transmit control (signaling) and data information to device 2 (for example, data are scheduled by the signaling); device 2 may transmit feedback information to device 1, such as at least one of hybrid automatic repeat request acknowledgment information (HARQ-ACK), an MCS, a channel quality indicator (CQI), a PMI, a rank indicator (RI), and beam information; and device 2 may also transmit control information and data information to device 1. Likewise, device 1 may also transmit feedback information to device 2.

As shown in FIG. 3, device 1 may transmit a reference signal for device 2 to obtain CSI. The reference signal may be marked as an XRS, which may also be referred to as a channel state information reference signal (CSI-RS) or a sounding reference signal (SRS). Device 2 may measure the XRS and may obtain CSI of a channel from device 1 to device 2. For the sidelink, as identical frequency resources are used between devices for communication, device 2 may further obtain the CSI of the channel from device 2 to device 1 by using channel reciprocity.

For example, based on the CSI, device 2 may perform link adaptation on the data transmitted to device 1; for example, it selects parameters such as an MCS, a PMI, a beam, and a rank, etc., that are most adaptable to the channel for data transmission. Device 2 may also assist in controlling the link adaptation of the data transmitted by device 1. For example, device 2 indicates the MCS, PMI, beam, rank and other parameters that are most adaptable to the channel to device 1 via signaling, and the signaling may be carried by a physical sidelink control channel (PSCCH) and/or a physical sidelink shared channel (PSSCH).

For another example, device 2 may configure via signaling that device 1 transmits the XRS periodically, or may trigger via signaling device 1 to transmit the XRS only once, and the above signaling may be carried by the PSCCH and/or the PSSCH. Alternatively, the network device notifies device 1 and device 2 of XRS configuration information via signaling of the Uu interface. Alternatively, device 1 selects one of multiple predefined XRS configurations to transmit, and notifies device 2 of the XRS configuration by using signaling. The sidelink transmission may take a slot or a subframe or a non-slot as a granularity. Following description shall be given by taking a slot as an example.

In the embodiment of this disclosure, for example, such waveforms as orthogonal frequency division multiplex (OFDM), single-carrier frequency division multiple access (SC-FDMA) or discrete Fourier transform spread orthogonal frequency division multiplex (DFT-s-OFDM) may be used, hence, the above symbols may be OFDM, SC-FDMA or DFT-s-OFDM symbols, which are hereinafter referred to as symbols; however, this disclosure is not limited thereto.

When a V2X device receives data, it needs a period of time for automatic gain control. For the NR V2X, in order to ensure integrity of XRS reception and accuracy of XRS measurement, the embodiment of this disclosure may reserve a period of time for automatic gain control (AGC) before an XRS symbol, that is, reserving a number of (one or more) AGC symbols, allowing enough time for correct XRS reception for automatic gain control. The AGC symbols may be used to transmit an AGC training signal or any other form of signal.

In addition, for a certain slot for transmitting an XRS, the XRS often only needs to occupy a part of the symbols in the slot in the time domain. For example, if the XRS follows the CSI-RS or SRS format defined in the NR Uu, the XRS uses at most 4 symbols for transmission in the time domain, and a slot contains 14 symbols. For symbols that are not used by the XRS in the slot, if they are not used, it is a waste of resources on the one hand, and on the other hand, it misses an opportunity to transmit and receive information, which is inconducive to achieving a goal of low latency. To this end, the embodiments of this disclosure provide solutions that support flexible multiplexing of XRS and data information, control information and feedback information in the same slot, and in a slot where the XRS is transmitted, reception and transmission of information may be achieved on the symbols that are not used by the XRS.

For a device that needs to transmit an XRS, in a certain slot, the device may only need to transmit the XRS, or may need to transmit the XRS and other information at the same time, or may need to transmit the XRS and receive other information at the same time. Other information here refers to information other than the XRS (hereinafter referred to as transmission information), which may include data information, control information, and feedback information.

In an embodiment, the time interval may further include a second part of symbols (one or more) for a guard interval or guard period.

In an embodiment, the second part of symbols may be located after the first part of symbols carrying the sidelink reference signal, and the first part of symbols and the second part of symbols are located at the rear of the time interval.

In an embodiment, the time interval may further include a third part of symbols (one or more) for automatic gain control, the third part of symbols being located before the first part of symbols carrying the sidelink reference signal.

FIG. 4 is an exemplary diagram of a time interval carrying the sidelink reference signal of the embodiment of this disclosure, giving an example when only an XRS is transmitted in a slot. As shown in FIG. 4, last G (G≥1) symbols of the slot are used as a guard interval or guard period to allow time for possible transmission and reception conversion between slots, information reception and transmission being not performed within the guard interval. The XRS is located in X (X≥1) symbols before the guard interval, and the slot where the XRS is located and a value of X may be notified to device 1 via signaling by device 2 in FIG. 3, or may be notified to device 1 and device 2 by the network device via signaling.

As shown in FIG. 4, the XRS may be placed at the end of the slot. On the one hand, it is convenient for the XRS to use "F" (flexible) and/or "U" (uplink) symbols in the NR Uu flexible slot format for transmission; this is because the sidelink usually may only use uplink frequency resources of NR Uu, and the "F" and/or "U" symbols are located at the end of the flexible slot. As a result, it is possible to support sharing NR Uu resources by the sidelink, thereby improving spectrum utilization efficiency.

For example, when there are fewer "F" and/or "U" symbols in the NR Uu slot, if it is used to transmit sidelink data, due to the AGC symbols, guard interval and a demodulation reference signal (DM-RS) need to occupy a part of the symbols, and there are few symbols that may be indeed used for data transmission, a use efficiency is not high; and if these "F" and/or "U" symbols are used to transmit the XRS, as the XRS needs no DM-RS overhead, the use efficiency of this part of "F" and/or "U" symbols may be improved.

On the other hand, when there is a high-priority service that needs to be transmitted or received in a current slot (such as when signaling for scheduling the service is received in the current slot), and the service needs to use the symbol where the XRS is located, as the XRS is located at the end of the slot, the device still has time to cancel transmission of the XRS, and instead performs transmission or reception of high-priority services. A frequency domain position and signal format of the XRS is not limited in the embodiment of this disclosure. For example, the XRS may use the SRS or CSI format in NR Rel-15. A (A≥1) AGC symbols are located before the XRS, the AGC symbols need to transmit a signal, and the transmitted signal may be an AGC training signal or any other form of signal.

In an embodiment, the time interval may further include a fourth part of symbols used to carry transmission information.

In an embodiment, there may be a fifth part of symbols for the guard interval between the first part of symbols and the fourth part of symbols.

In an embodiment, the time interval may further include a sixth part of symbols used for automatic gain control. The sixth part of symbols are located before the fourth part of symbols, or a number of former symbols in the fourth part of symbols are used as the sixth part of symbols for automatic gain control.

For example, symbols that are not used by the XRS may be used to receive information.

Figure 5:
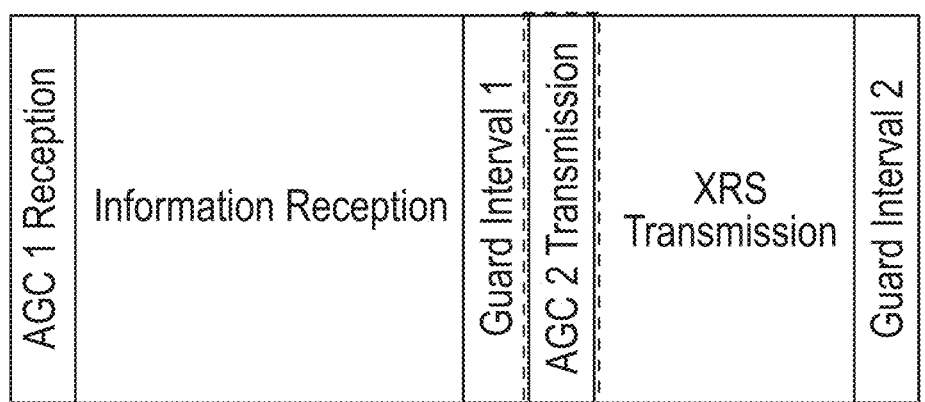
FIG. 5 is another exemplary diagram of the time interval carrying the sidelink reference signal of the embodiment of this disclosure.

FIG. 5 is another exemplary diagram of the time interval carrying the sidelink reference signal of the embodiment of this disclosure, giving an example that information reception and XRS transmission are simultaneously present in a slot. As shown in FIG. 5, A1 (A1≥1) AGC1 symbols are used for receiving signals, and automatic gain control is performed according to received signals. Next I (I≥1) symbols may be used to receive information transmitted by other devices. The information mentioned in the embodiment of this disclosure may be at least one of control information, data information, and feedback information.

The "AGC receiving" symbols in FIG. 5 is only an example of a possible situation, and what is carried by the AGC symbols may be an AGC training signal or valid information. When valid information is carried, the receiving device may also use these AGC symbols for information demodulation and decoding. Whether the receiving device uses the AGC symbols shown in FIG. 5 to perform automatic gain control may be dependent on implementation. For example, when the receiving device deems that automatic gain control needs not to be adjusted, it is not necessary to perform automatic gain control on every slot. In summary, related parts of automatic gain control may follow existing techniques, which are not changed in this disclosure. The above description is also applicable to the "AGC transmitting" symbols shown in FIG. 5 of this disclosure, or "AGC receiving" and/or "AGC transmitting" in other drawings.

As shown in FIG. 5, next G1 (G1≥1) symbols do not transmit and receive information, and as a guard interval 1, a time for conversion of information reception and AGC 2 plus XRS transmission is allowed. AGC training signals or other forms of signals need to be transmitted in A2 (A2≥1) AGC 2 symbols for automatic gain control of the XRS. X (X≥1) symbols are used for XRS transmission. G2 (G2≥1) symbols are not used for information transmission and reception, and as a guard interval 2, a time for possible conversion of transmission and reception between slots is allowed.

For another example, symbols that are not used by the XRS may be used to transmit information.

Figure 6:
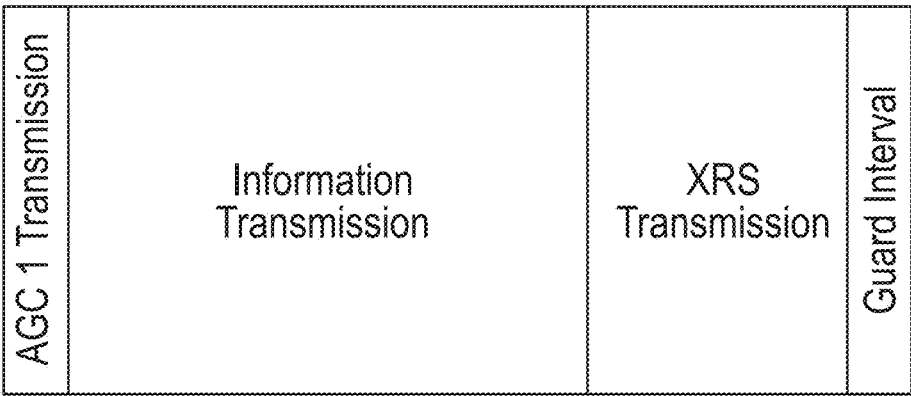
FIG. 6 is a further exemplary diagram of the time interval carrying the sidelink reference signal of the embodiment of this disclosure.

FIG. 6 is a further exemplary diagram of the time interval carrying the sidelink reference signal of the embodiment of this disclosure, giving an example that information transmission and XRS transmission exist simultaneously in a slot. As shown in FIG. 6, as transmit power in the same slot does not change, a signal transmitted in former A (A≥1) AGC symbols in the slot may be used as automatic gain control for both information and the XRS. As no transmission and reception conversion between the information and the XRS, there is no need for a guard interval between them. As overhead of the AGC and the guard interval symbols is saved, spectrum efficiency is improved.

The first device transmitting the XRS may decide which slot format in FIGS. 4-6 is used according to whether information needs to be received and transmitted; for example, when information needs to be received in the slot for transmitting the XRS, the slot format in FIG. 5 is used, and when information needs to be transmitted in the slot for transmitting the XRS, the slot format of in FIG. 6 is used.

FIG. 7 is yet another exemplary diagram of the time interval carrying the sidelink reference signal of the embodiment of this disclosure, which corresponds to FIGS. 4-6, and shall be schematically described from an angle of XRS reception. Reception and transmission directions FIG. 7 are opposite to those in FIGS. 4-6.

Figure 8:
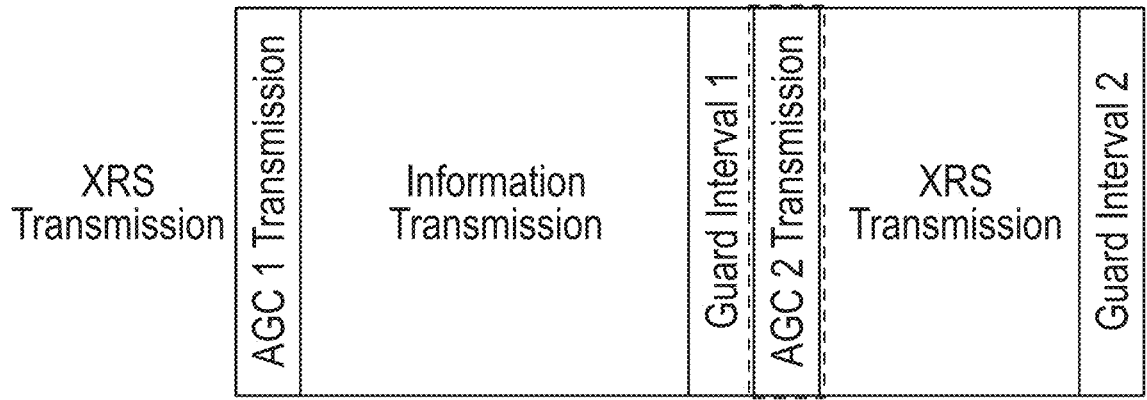
FIG. 8 is still another exemplary diagram of the time interval carrying the sidelink reference signal of the embodiment of this disclosure.

FIG. 8 is still another exemplary diagram of the time interval carrying the sidelink reference signal of the embodiment of this disclosure, giving an example that information transmission and XRS transmission exist simultaneously in a slot. As shown in FIG. 8, when information needs to be transmitted in the slot at which the XRS is transmitted, a slot format in FIG. 8 may also be used for XRS transmission and XRS reception, which may have a unified XRS slot format, thereby simplifying the design.

For another example, the receiving device may perform CSI estimation and reporting based on the XRS. The symbol carrying the CSI may also be located at the end of the slot. In addition, HARQ-ACK may also be transmitted by using the symbols at the end of the slot. The CSI and/or the HARQ-ACK may be transmitted by using the same slot structure as the above XRS. The CSI and/or the HARQ-ACK are transmitted by using a number of symbols at the end of the slot, a number of symbols before the symbol carrying the CSI and/or the HARQ-ACK may be used as AGC, and a number of symbols after the symbol carrying the CSI and/or the HARQ-ACK are used as guard intervals, that is, the "XRS transmission" and "XRS reception" in the above implementation and FIGS. 4-8 may be respectively replaced with "CSI and/or HARQ-ACK transmission" and "CSI and/or HARQ-ACK reception".

In an embodiment, the first part of symbols may also be used for automatic gain control.

For example, for NR V2X, under certain conditions, transmit power between a pair of transceiving devices may not change significantly and/or channels thereof are relatively closely correlated. For example, a pair of transceiving devices or vehicles in a fleet (any pair of members in the fleet may be regarded as a pair of transceiving devices) may move in the same direction at an identical or similar speed. At this moment, for the XRS that is transmitted periodically, there may be no need to reserve AGC symbols before the XRS symbol, and the XRS may be directly used as an AGC training signal.

Figure 9:
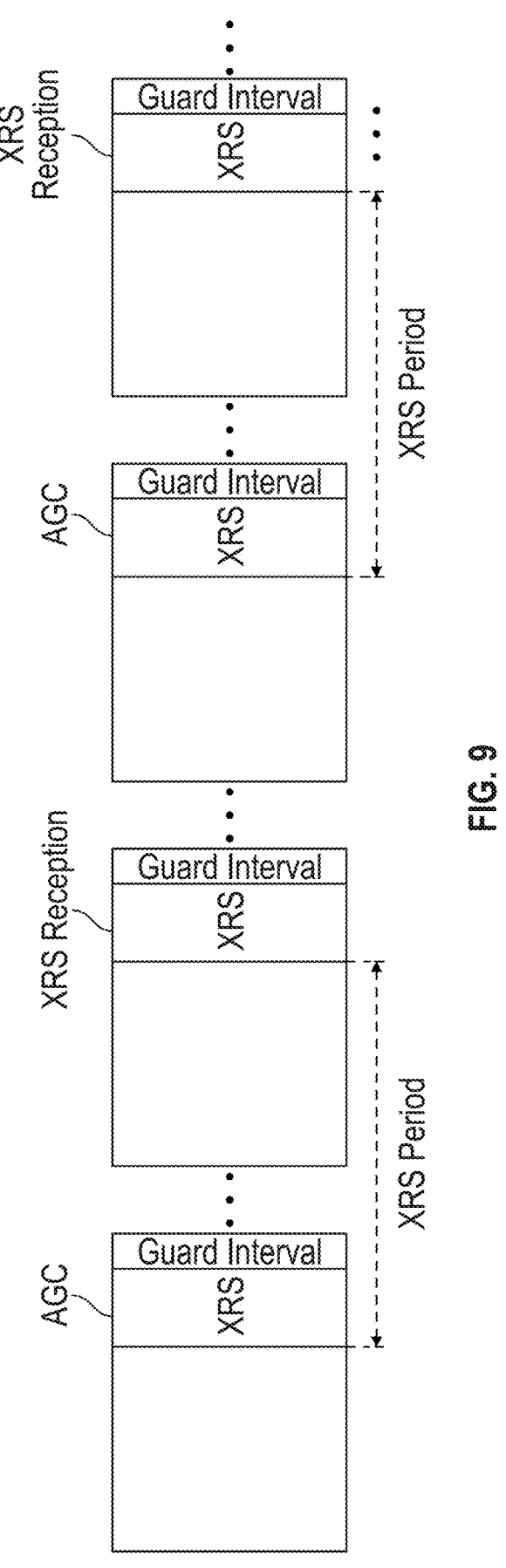
FIG. 9 is yet still another exemplary diagram of the time interval carrying the sidelink reference signal of the embodiment of this disclosure.

FIG. 9 is yet still another exemplary diagram of the time interval carrying the sidelink reference signal of the embodiment of this disclosure, which shall be schematically described from an angle of the second device that receives the XRS. As shown in FIG. 9, for the XRS that is periodically transmitted, there may be no need to reserve AGC symbols before the XRS symbol, and the XRS is directly used as the AGC training signal, that is, the second device adjusts automatic gain control based on the XRS received at a certain time, and may not be perform automatic gain control adjustment in a later period of time; instead, it directly receives a number of subsequent XRSs based on a result of last adjustment. After a period of time, the above process may be repeated again to achieve a goal of continuous calibration of AGC.

Figure 10:
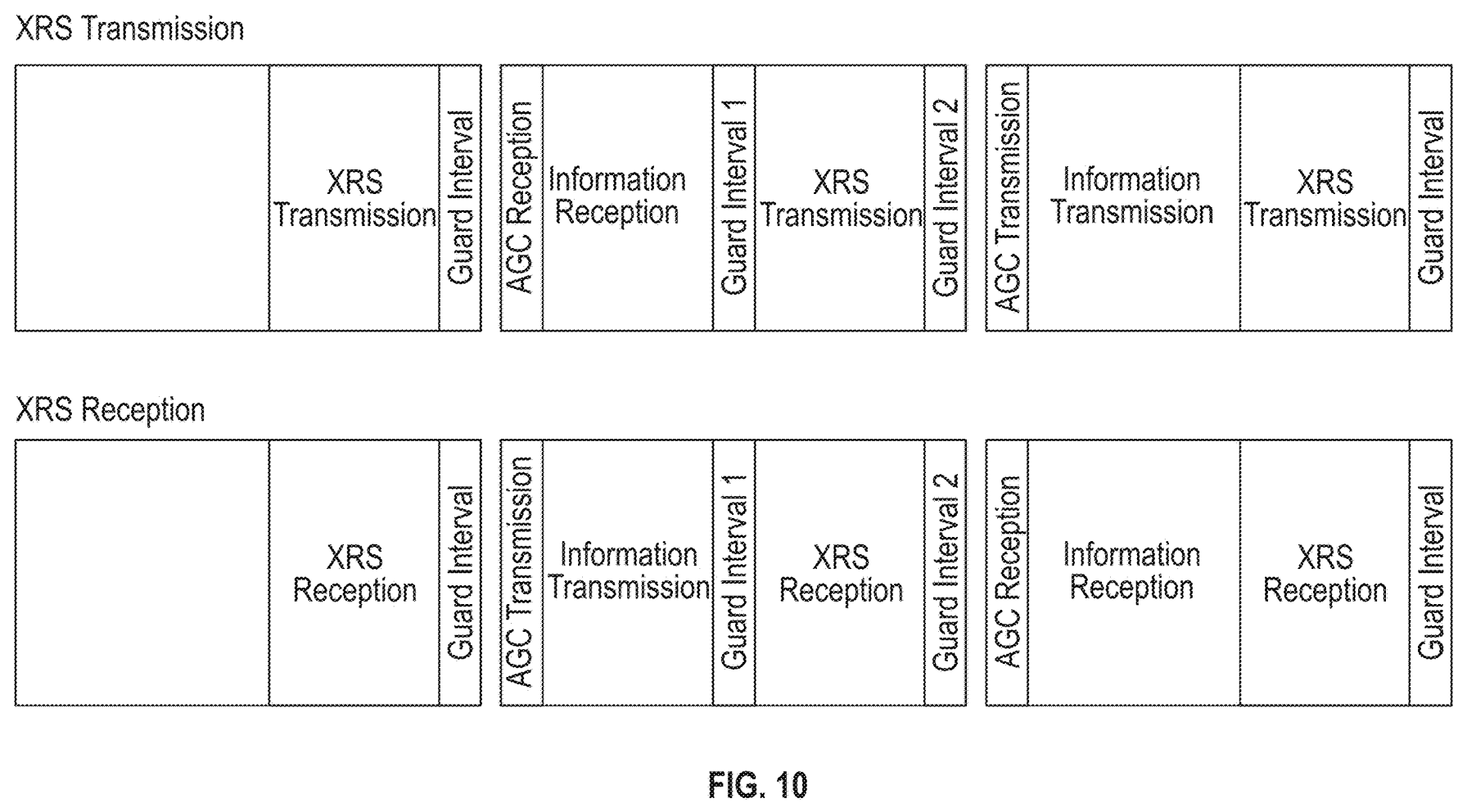

FIG. 10 is further still another exemplary diagram of the time interval carrying the sidelink reference signal of the embodiment of this disclosure, showing slot formats of an XRS transmission slot and an XRS reception slot when the XRS is used as an AGC training signal. As the XRS is used as an AGC training signal, an AGC symbol needs not be reserved before the XRS symbol, thereby reducing AGC symbol overhead, and improving resource utilization.

FIG. 11 is a yet further exemplary diagram of the time interval carrying the sidelink reference signal of the embodiment of this disclosure, showing slot formats of an XRS transmission slot and an XRS reception slot when the XRS is used as an AGC training signal. As shown in FIG. 11, a unified XRS slot format may be used when information and an XRS need to be transmitted or received at the same time within a slot. Hence, the XRS slots have a unified XRS slot format, thereby simplifying the design.

In an embodiment, the first part of symbols may be located at the front of the time interval.

FIG. 12 is further still another exemplary diagram of the time interval carrying the sidelink reference signal of the embodiment of this disclosure, showing a case where the XRS is arranged at a head of a slot when the XRS is used as an AGC training signal. As shown in FIG. 12, when a device receives the XRS, the XRS may be used at the beginning for automatic gain control, and a result thereof is applied for demodulation and decoding of subsequent symbols in the slot. When an XRS and information need to be transmitted in the slot at the same time, the XRS is used as an AGC training signal, it is completely not needed to reserve AGC symbols in FIG. 12, thereby saving AGC symbol overhead, and improving spectral efficiency.

FIG. 13 is yet further still another exemplary diagram of the time interval carrying the sidelink reference signal of the embodiment of this disclosure, showing a case where the XRS is arranged at a head of a slot when the XRS is used as an AGC training signal. As shown in FIG. 13, a unified XRS slot format may be used when information and an XRS need to be transmitted or received at the same time within a slot. Hence, the XRS slots have a unified XRS slot format, thereby simplifying the design.

In addition, for such scenarios as channels between transceiver devices are not closely correlated, or distances between devices change rapidly, etc., the AGC symbols may be reserved before the symbol where the XRS is located in FIG. 12 and FIG. 13, which may be used for automatic gain control slot by slot.

It should be noted that the time interval carrying the sidelink reference signal is schematically described above by taking a slot as an example; however, this disclosure is not limited thereto. Related contents of power control shall be described below.

In an embodiment, the first device may determine whether there exist the third part of symbols used for automatic gain control before the first part of symbols according to a power control state or signaling related to power control received from the network device and/or the terminal equipment.

In an embodiment, the first device may determine whether there exist sixth part of symbols used for automatic gain control before the fourth part of symbols or whether former one or more symbols in the fourth part of symbols is/are used as sixth part of symbols used for automatic gain control according to a power control state or signaling related to power control received from the network device and/or the terminal equipment.

For example, for unicast services and groupcast services, NR V2X may perform power control on the transceiver device, such as open-loop power control and closed-loop power control. With power control, a signal-to-noise ratio of the receiving device may be stabilized within a certain range. After good power control between the transceiver devices is achieved, AGC symbols may not be reserved, thereby reducing overhead and improving spectrum efficiency.

Whether an AGC symbol is reserved before the XRS symbol and/or whether an AGC symbol is reserved before the information symbol may be dependent on the power control state. For example, when a V2X device receives signaling from other V2X devices and/or network devices and when the V2X device transmits a signal, an AGC symbol is not reserved before the XRS symbols and/or the information symbols, that is, symbols in the slot other than the guard interval may be used for transmitting the XRS and/or information.

The above signaling may be higher layer signaling, such as radio resource control (RRC), a media access control (MAC) control element (CE); and it may also be physical layer signaling, such as a physical downlink control channel (PDCCH), a PSCCH. And the above signaling may be signaling related to power control, such as downlink control information (DCI) instructing a device to perform power control adjustment and/or sidelink control information (SCI).

Configuration of the sidelink reference signal shall be schematically described below.

For example, when the sidelink and the NR Uu use identical spectral resources, making the XRS use the "F" and/or "U" symbols of the NR Uu to transmit may effectively improve the spectrum utilization. The flexible slot formats of the NR Uu are usually "D", "F" and "U", respectively denoting a downlink symbol, a flexible symbol, and an uplink symbol. The "F" and "U" symbols are located at the end of the slot. The above XRS may be configured to be transmitted on the "F" and/or "U" symbols. For a case where the XRS is located at the end of the slot, the "F" and/or "U" symbols in the "D", "F" and "U" slots of the NR Uu may be used naturally; and for a case where the XRS is not located at the end of the slot, the XRS may be independently configured at the ends of "D", "F" and "U" slots of the NR Uu, that is, the XRS may have different positions at different slots.

The slot of the NR Uu may possibly contain fewer "F" and/or "U" symbols, that is, only fewer symbols may be used for side link transmission. If this part of symbols are used to transmit at least one of sidelink data, control and feedback information, except symbols occupied by AGC, the guard interval and DM-RS (belonging to overhead symbols), symbols that may be truly used for information transmission may even be less than the overhead symbols. In contrast, the XRS needs no DM-RS, the XRS may even do not need an AGC symbol, and the XRS may use very few symbols to operate normally. For example, an SRS in NR Rel-15 may be transmitted by using 1, 2 or 4 symbols.

These characteristics of the XRS make it suitable for being transmitted on fewer symbols. If this part of "F" and/or "U" symbols are used to transmit the XRS, even if this part of symbols are few, they may be utilized very well, thereby improving the spectrum utilization. When the XRS is transmitted on the "F" and/or "U" symbols of the NR Uu, transmission of the XRS is not necessarily periodic. Therefore, in addition to the signaling for configuring a periodic XRS, additional signaling and/or method is/are needed to configure the XRS on the "F" and/or "U" symbols of NR Uu for transmission.

In an embodiment, the network device may transmit the configuration information of the sidelink reference signal to the terminal equipment (the first device and/or the second device). The first device may determine the first part of symbols for transmitting the sidelink reference signal according to the configuration information of the sidelink reference signal transmitted by the network device. Or, the second device may determine the first part of symbols for transmitting the sidelink reference signal according to the configuration information of the sidelink reference signal transmitted by the network device, and transmit information on the first part of symbols to the first device.

For example, as the network device knows slot format information of a Uu port, the network device may determine feasible XRS configuration. The network device here may be an LTE base station and/or an NR base station; however, it is not limited thereto. With the XRS configuration, at least one of the slot where the XRS is located, symbols used by the XRS in the slot, a sequence used by the XRS, a subcarrier used by the XRS and the RE mapping of the XRS may be determined, and one time of XRS transmission may be triggered, or multiple times of XRS transmission may be configured.

The network device may notify the XRS configuration information to the V2X device via Uu port signaling. The signaling here may be higher layer signaling, such as RRC, and an MAC CE, etc., or may be physical layer signaling, such as a PDCCH. The network device may notify an XRS transmitting device and an XRS receiving device of the XRS configuration information. The network device may also notify the XRS transmitting device of the XRS configuration information, and then the XRS transmitting device notifies the XRS receiving device of the XRS configuration information via sidelink signaling, which is equivalent to notifying it to perform XRS reception. And the network device may also notify the XRS receiving device of the XRS configuration information, and then the XRS receiving device notifies the XRS configuration information to the XRS transmitting device via sidelink signaling, which is equivalent to notifying it to perform XRS transmission. The above sidelink signaling may be carried by a PSCCH and/or a PSSCH.

In an embodiment, the network device may transmit slot format configuration information of a cellular link to the terminal equipment. The first device receives the slot format configuration information of the cellular link transmitted by the network device, and determines the first part of symbols transmitting the sidelink reference signal according to the slot format configuration information of the cellular link. Or, the second device receives the slot format configuration information of the cellular link transmitted by the network device, determines the first part of symbols transmitting the sidelink reference signal according to the configuration information of the sidelink reference signal, and transmits information on the first part of symbols to the first device.

For example, the V2X device may receive and obtain the slot configuration information via the NR Uu port, for example, it may obtain at least one of higher layer parameters tdd-UL-DL-ConfigurationCommon, tdd-UL-DL-ConfigurationCommon2, tdd-UL-DL-ConfigDedicated, and/or, physical layer PDCCH signaling DCI format 2_0. At this moment, the V2X device may obtain slot format information of the NR Uu port according to the above information, hence, the V2X device may determine feasible XRS configuration.

The XRS transmitting device may determine the feasible XRS configuration by itself, transmit the XRS according to the configuration, and notify the XRS configuration information to the XRS receiving device via sidelink signaling. Or, the XRS receiving device may determine the feasible XRS configuration by itself, and notify the XRS transmitting device of the XRS configuration information via sidelink signaling, and the XRS transmitting device transmits the XRS according to the configuration. The above sidelink signaling may be carried by a PSCCH and/or a PSSCH.

In an embodiment, the first part of symbols of the sidelink reference signal correspond to uplink symbols (U) and/or flexible symbols (F) in the cellular link. It should be noted that the above uplink symbols (U), downlink symbols (D) and flexible symbols (F) all refer to symbols of cellular resources.

The above embodiments or implementations only illustrate the embodiment of this disclosure. However, this disclosure is not limited thereto, and appropriate variants may be made on the basis of these embodiments or implementations. For example, the above embodiments or implementations may be executed separately, or one or more of them may be executed in a combined manner.

It can be seen from the above embodiments that the sidelink reference signal (hereinafter referred to as an XRS) used for obtaining CSI is carried in the first part of symbols of the time interval. Hence, measurement and reporting of the CSI may be supported in V2X, and different scenarios and different demands for services may be satisfied.

Embodiment 2

The embodiments of this disclosure provide a method for transmitting a reference signal, with contents identical to those in Embodiment 1 being not going to be described herein any further. The embodiments may be implemented separately or in combination with Embodiment 1. In the embodiments of this disclosure, some information may be transmitted by preempting resources of a sidelink reference signal, and some information may be multiplexed with the sidelink reference signal for transmission in the same slot, thereby being able to flexibly support sharing resources between services of different types and/or priorities, and improving spectral utilization of the sidelink.

For example, an NR V2X device may also need to transmit and receive other information in a slot for transmitting and receiving an XRS. The information may be unicast information, groupcast information or broadcast information transmitted and received via the sidelink, and may also be information transmitted and received via an NR Uu port. In addition, the information may be data information, or control information, or feedback information; however, this disclosure is not limited thereto.

Some information will inevitably coincide with the XRS in the slot in time and/or frequency. For example, if the NR V2X device also needs to transmit and receive broadcast information in the slot receiving and transmitting the XRS, as the broadcast information needs to occupy the entire slot in time and the XRS needs to occupy all or a relatively wide frequency range so as to measure an entire frequency band, the broadcast information will coincide with the XRS in time and/or frequency.

For example, when device 1 transmits the XRS to device 2 at a slot and needs to transmit unicast or groupcast information to device 3 at the same slot, the unicast or groupcast information will also coincide with the XRS in time and/or frequency.

Likewise, when the sidelink uses NR Uu time-frequency resources, if the NR V2X device needs to transmit and receive information with a network device in the slot receiving and transmitting the XRS, the information may also possibly coincide with the XRS in time and/or frequency. When XRS and other information coincide in time and/or frequency resources, how to transmit and receive the XRS and other information is a problem needing to be solved.

FIG. 14 is a schematic diagram of the method for transmitting a reference signal of the embodiment of this disclosure, showing a situation at a transmitting device side. As shown in FIG. 14, the method includes:

step 1401: a first device determines a sidelink reference signal used for obtaining channel state information; wherein the sidelink reference signal is carried in a first part of symbols of a time interval;

step 1402: the first device determines that the time interval is further used to transmitting or receiving transmission information; and step 1403: the first device determines a part or all of time frequency resources transmitting the sidelink reference signal as being used for transmitting or receiving the transmission information.

It should be noted that FIG. 14 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 14.

In an embodiment, the first device may further determine whether a priority of the transmission information is higher than a first threshold, and may determine a part or all of the time-frequency resources for transmitting the sidelink reference signal as being used for transmitting or receiving the transmission information when the priority of the transmission information is higher than the first threshold.

In an embodiment, the transmission information may include at least one of the following: unicast information, groupcast information, broadcast information, information transmitted to the network device, and information with a relatively high priority; however, this disclosure is not limited thereto.

FIG. 15 is an exemplary diagram of transmitting multiple types of services of the embodiment of this disclosure. NR V2X supports multiple services such as unicast, groupcast, and broadcast, and the same V2X device may also need to support multiple types of services at the same time. XRSs are necessary for some services, and some services do not need an XRS. For example, a unicast service needs an XRS to perform link adaptation, thereby increasing a data transmission rate. Both transmitting and receiving devices of a unicast service know a position of the XRS. Therefore, at a slot where the XRS exists, symbols unoccupied by XRS may be used to perform transmission or reception. For example, a broadcast service does not need an XRS, a transceiver device of the broadcast service does not even need to be aware of the existence of the XRS, and all symbols in the slot may be used for transmission and reception of the broadcast service.

As shown in FIG. 15, device 1 and device 2 are able to support unicast services and broadcast services at the same time, and device 3 and device 4 only support broadcast services, hence, XRS configuration is known to device 1 and device 2, and the XRS is unknown to device 3 and device 4. When device 1 needs to transmit broadcast information in the slot where the XRS is present, as all surrounding devices of device 1, including device 2, device 3 and device 4, need to receive the broadcast information and the XRS is unknown to device 3 and device 4, device 1 is unable to only use symbols unoccupied by the XRS to transmit the broadcast information. This will affect reception of the broadcast information by most devices, and the broadcast information, such as road safety information, is usually key information, it is needed to ensure that as many as possible devices receive correctly.

In an embodiment, the transmission information is transmitted or received on all resource blocks at the time interval, and transmission of the sidelink reference signal at the time interval is cancelled.

For example, the broadcast information may be enabled to preempt an XRS resource for transmission, that is, the XRS is not transmitted at this slot, and only the broadcast information is transmitted.

Figure 16:
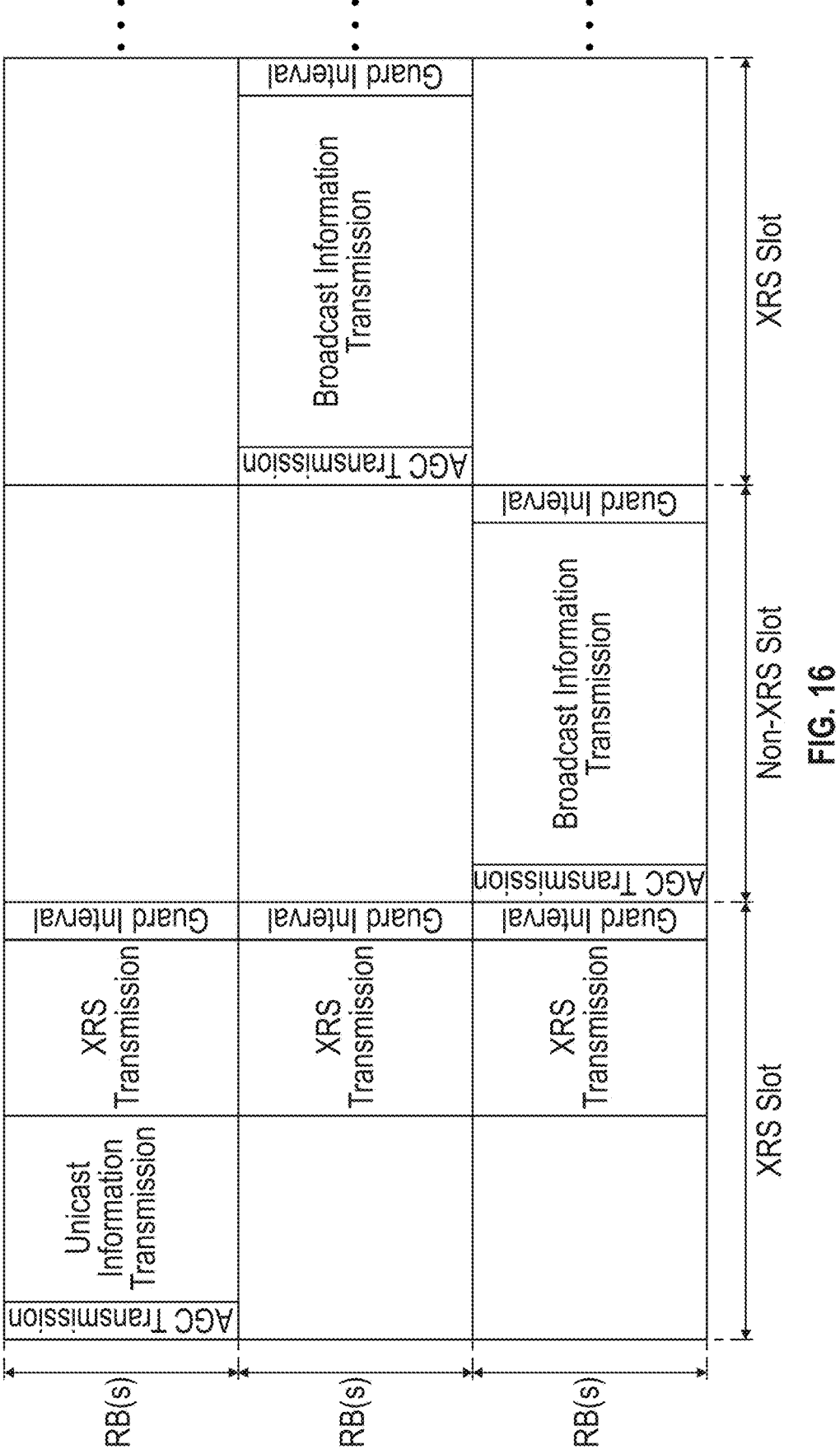
FIG. 16 is a schematic diagram of a resource for transmitting the sidelink reference signal of the embodiment of this disclosure.

FIG. 16 is a schematic diagram of a resource for transmitting the sidelink reference signal of the embodiment of this disclosure, showing a time-frequency resource pool used for sidelink transmission. As shown in FIG. 16, a slot needing to transmit an XRS is marked as "an XRS slot", and a slot transmitting no XRS is marked as "a non-XRS slot". One time of information transmission occurs in a number of resource blocks (RBs) in the frequency domain and a slot range in the time domain. For the non-XRS slot, the entire slot may be used for information transmission. And for the XRS slot, when there is unicast information needing to be transmitted at this slot, as both the transmitting and receiving devices know a position of the XRS, the unicast information may be multiplexed with the XRS in any manner described in Embodiment 1, and FIG. 16 only illustrates one manner in which the unicast information is multiplexed with the XRS transmission.

For the XRS slot, when there is broadcast information needing to be transmitted at this slot, as the broadcast information needs to occupy the entire slot in time, the broadcast information will coincide with the XRS in time, and as the XRS occupies all RBs in the resource pool in frequency, the broadcast information will coincide with the XRS in frequency. As the XRS is mainly used for channel measurement, in contrast, the broadcast information is more important to safe driving of a vehicle equipment. Therefore, only the broadcast information is transmitted at this slot, and transmission of the XRS is cancelled.

As the receiving device of the unicast information (such as device 2 in FIG. 15) also needs to receive broadcast information, when the device receives control signaling scheduling the broadcast information, it will receive the broadcast information in the XRS slot, instead of performing XRS reception and subsequent channel measurement, and the XRS slot preempted by broadcast information is also not used for calculating and counting results of the channel measurement.

In an embodiment, the transmission information is transmitted or received on a part of resource blocks at the time interval, and the sidelink reference signal is transmitted on other resources at the time interval.

For example, when the NR V2X device needs to transmit the XRS and other information at the same slot and complete information and a part of the XRS may be transmitted when the information will coincide with the XRS in time and/or in frequency, the part of the XRS coinciding with the information is not transmitted, that is, transmission of the part of XRS coinciding with the information is cancelled.

Figure 17:
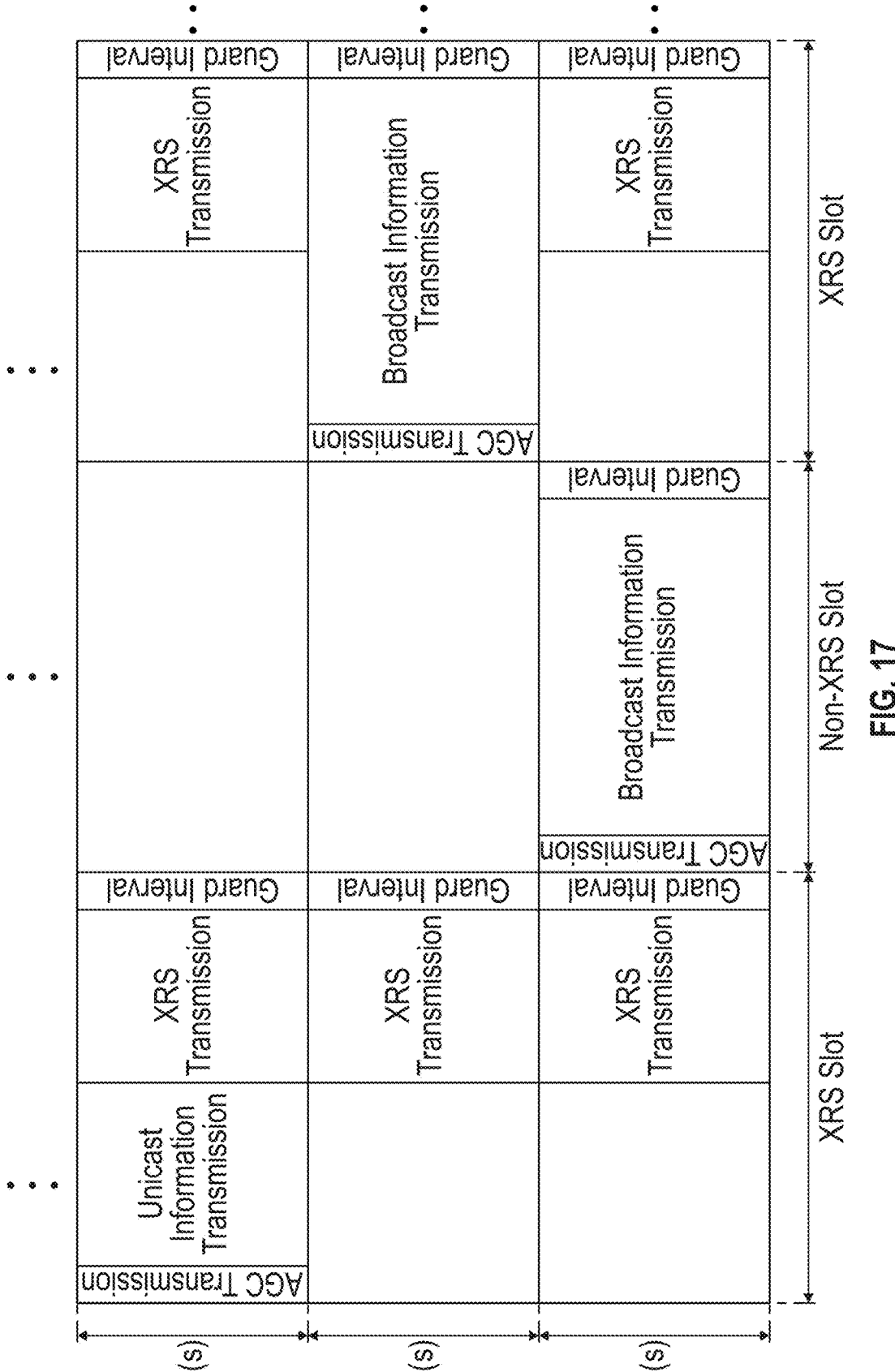
FIG. 17 is another schematic diagram of the resource for transmitting the sidelink reference signal of the embodiment of this disclosure.

FIG. 17 is another schematic diagram of the resource for transmitting the sidelink reference signal of the embodiment of this disclosure, showing a time-frequency resource pool used for sidelink transmission. For the XRS slot in FIG. 17 where broadcast information needs to be transmitted, the XRS should originally be transmitted by using all RBs in the resource pool. Here, the broadcast information preempts the XRS in a part of the RBs, hence, the broadcast information may be completely transmitted, the XRS in RBs coinciding with the broadcast information is not transmitted, and the XRS in other RBs not coinciding with the broadcast information may be transmitted as usual, and this part of the XRS may still be used for channel measurement. With this implementation, transmission of the broadcast information is guaranteed, and the XRS may also be transmitted at the same slot.

The above description is given by taking broadcast information as an example; however, this disclosure is not limited thereto, and it may also be applicable to unicast information, or groupcast information, or information transmitted to a network device, or information with a relatively high priority.

In one embodiment, when the NR V2X device needs to transmit the XRS and other information in the same slot and the information will coincide with the XRS in time and/or in frequency, when a priority of the information is higher than a threshold, the information is only transmitted and the XRS is not transmitted, that is, transmission of the XRS is cancelled.

In another embodiment, it may also be that when the priority of the information is higher than a threshold, complete information and a part of the XRS are transmitted, and the part of the XRS coinciding with the information is not transmitted, that is, transmission of the part of the XRS coinciding with the information is cancelled.

It should be noted that whether to allow the information to preempt the XRS to be transmitted is determined based on the priority of the information, and only when the priority of the information is relatively high, can the information preempt the XRS. The above priority may come from a field in control signaling scheduling the information. And the above threshold may be predefined or may be configured, such as being configured by a higher layer.

Likewise, when the first device needs to transmit an XRS at a slot, it may also need to receive other information at this slot, and this information may also coincide with the XRS in time and/or in frequency. And behaviors of the device may be determined in the following manners:

when the NR V2X device needs to transmit the XRS and receive other information at the same slot and the information will coincide with the XRS in time and/or in frequency, receiving the information only and not transmitting the XRS;

or, receiving the information and transmitting the part of XRS not coinciding with the information in time and in frequency;

or, when the priority of the information is higher than a threshold, receiving the information only and not transmitting the XRS;

or, when the priority of the information is higher than a threshold, receiving the information and transmitting the part of XRS not coinciding with the information in time and in frequency.

Likewise, when the second device needs to receive an XRS at a slot, it may also need to transmit other information at this slot, and this information may also coincide with the XRS in time and/or in frequency. And behaviors of the device may be determined in the following manners:

when the NR V2X device needs to receive the XRS and transmit other information at the same slot and the information will coincide with the XRS in time and/or in frequency, transmitting the information only and not receiving the XRS;

or, transmitting the information and receiving the part of XRS not coinciding with the information in time and in frequency;

or, when the priority of the information is higher than a threshold, transmitting the information only and not receiving the XRS;

or, when the priority of the information is higher than a threshold, transmitting the information and receiving the part of XRS not coinciding with the information in time and in frequency.

The above priority may come from a field in the control signaling scheduling the transmission of the information. The above control signaling scheduling the information reception may come from a network device, such as an NR base station and/or an LTE base station, etc., or it may come from an NR V2X device. In addition, it may not be allowed to transmit information coinciding with the XRS in time and/or in frequency at the slot where the XRS is received.

Likewise, when the second device needs to receive an XRS at a slot, it may also need to receive other information at this slot, and this information may also coincide with the XRS in time and/or in frequency. And behaviors of the device may be determined in the following manners:

when the NR V2X device needs to receive the XRS and other information at the same slot and the information will coincide with the XRS in time and/or in frequency, receiving the information only and not receiving the XRS;

or, receiving the information and receiving the part of XRS not coinciding with the information in time and in frequency;

or, when the priority of the information is higher than a threshold, receiving the information only and not receiving the XRS;

or, when the priority of the information is higher than a threshold, receiving the information and receiving the part of XRS not coinciding with the information in time and in frequency.

The above priority may come from a field in the control signaling scheduling the transmission of the information. The above control signaling scheduling the information reception may come from a network device, such as an NR base station and/or an LTE base station, etc., or it may come from an NR V2X device. In addition, it may not be allowed to receive information coinciding with the XRS in time and/or in frequency at the slot where the XRS is received.

Embodiment 3

The embodiments of this disclosure provide a method for transmitting a reference signal, with contents identical to those in Embodiment 1 or Embodiment 2 being not going to be described herein any further. The embodiments may be implemented separately or in combination with Embodiment 1 or in combination with Embodiment 2 or in combination with embodiment 1 and 2.

In the embodiment of this disclosure, resources of a sidelink reference signal may be preempted for transmission under a condition of meeting a requirement for processing time, thereby being able to support sharing resources between services of different types and/or priorities, and improving spectral utilization of the sidelink.

FIG. 18 is a schematic diagram of the method for transmitting a reference signal of the embodiment of this disclosure, showing a case at a transmitting device side. As shown in FIG. 18, the method includes:

step 1801: a first device determines a sidelink reference signal used for obtaining channel state information; wherein the sidelink reference signal is carried in a first part of symbols of a time interval;

step 1802: the first device receives scheduling information used for indicating transmission information;

step 1803: the first device determines that a period from a moment of time of receiving the scheduling information to the sidelink reference signal is greater than a second threshold; and step 1804: the first device determines a part or all of time frequency resources transmitting the sidelink reference signal as being used for transmitting or receiving the transmission information.

It should be noted that FIG. 18 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 18.

In an embodiment, the transmission information may include at least one of the following: unicast information, groupcast information, broadcast information, information transmitted to the network device, and information with a relatively high priority; however, this disclosure is not limited thereto.

In an embodiment, the transmission information is transmitted or received on all resource blocks at the time interval, and transmission of the sidelink reference signal at the time interval is cancelled.

For example, when the NR V2X device needs to transmits the XRS and other transmission information at the same time slot and the transmission information will coincide with the XRS in time and/or in frequency, when a time interval between a last symbol where the received control signaling scheduling transmission of the transmission information and a first symbol where the XRS is located is greater than a threshold, only the transmission information is transmitted and the XRS is not transmitted, that is, transmission of the XRS is cancelled; otherwise, only the XRS is transmitted and the transmission information is not transmitted.

In an embodiment, the transmission information is transmitted or received on a part of resource blocks at the time interval, and the sidelink reference signal is transmitted on other resources at the time interval.

For example, when the NR V2X device needs to transmits the XRS and other transmission information at the same time slot and the transmission information will coincide with the XRS in time and/or in frequency, when a time interval between a last symbol where the received control signaling scheduling transmission of the transmission information and a first symbol where the XRS is located is greater than a threshold, the complete transmission information and a part of the XRS are transmitted and a part of the XRS coinciding with the transmission information is not transmitted, that is, transmission of the art of the XRS coinciding with the transmission information is cancelled; otherwise, only the XRS is transmitted and the transmission information is not transmitted.

Therefore, the first device may use the above time interval to determine whether transmission of the XRS may be cancelled in time. If the time left for the first device to perform a cancel operation is too short and it is too late to cancel the transmission of the XRS, the first device will transmit the XRS and will not transmit the transmission information. The above control signaling scheduling the transmission information may come from a network device, such as an NR base station and/or an LTE base station, etc., or it may come from an NR V2X device.

Embodiment 3 and Embodiment 2 may be combined, that is, determination of the priority (whether the priority is greater than the first threshold) and determination of the time where the transmission of the XRS is cancelled (whether the time is greater than the second threshold) may be used in a combine manner, that is, the first device cancels the transmission of the XRS only when the above conditions are satisfied.

In another embodiment, it may not be allowed to transmit information coinciding with the XRS in time and/or in frequency within the slot at which the XRS is transmitted.

Likewise, when the first device needs to transmit the XRS at a slot, it may also need to receive other information at this slot, and this information may also coincide with the XRS in time and/or in frequency. And behaviors of the device may be determined in the following manners:

when the NR V2X device needs to transmit the XRS and receive other information at the same slot and the information will coincide with the XRS in time and/or in frequency, and when a time interval between a last symbol where the received control signaling scheduling reception of the information and a first symbol where the XRS is located is greater than a threshold, receiving the information and not transmitting the XRS; otherwise, not receiving the information and transmitting the XRS;

or, when a time interval between a last symbol where the received control signaling scheduling reception of the information and a first symbol where the XRS is located is greater than a threshold, receiving the information and transmitting the part of the XRS not coinciding with the information in time and/or in frequency; otherwise, not receiving the information and transmitting the complete XRS.

The above priority may come from a field in the control signaling scheduling the reception of the information. And the control signaling scheduling the reception of the information may come from a network device, such as an NR base station and/or an LTE base station, etc., or it may come from an NR V2X device.

Embodiment 4

The embodiments of this disclosure provide a method for receiving a reference signal, which shall be described from a receiving device (a second device) side, with contents identical to those in embodiments 1-3 being not going to be described herein any further. The receiving device may be a terminal equipment; however, this disclosure is not limited thereto; for example, it may also be a roadside device or a network device.

FIG. 19 is a schematic diagram of the method for receiving a reference signal of the embodiment of this disclosure, showing a case at a receiving device side. As shown in FIG. 19, the method includes:

step 1901: a second device receives a sidelink reference signal transmitted by a first device; wherein the sidelink reference signal is carried in a first part of symbols of a time interval; and step 1902: the second device performs channel measurement according to the sidelink reference signal to obtain channel state information.

In an embodiment, the second device may further feed back the CSI to the first device.

It should be noted that FIG. 19 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 19.

In an embodiment, the time interval includes at least one of the following: a slot, a subframe, a frame, a non-slot, and a mini-slot.

In an embodiment, the second part of symbols may be located after the first part of symbols carrying the sidelink reference signal, and the first part of symbols and the second part of symbols are located at the rear of the time interval.

In an embodiment, the time interval may further include a third part of symbols for automatic gain control, the third part of symbols being located before the first part of symbols carrying the sidelink reference signal.

In an embodiment, the first part of symbols are located at the front of the time interval.

In an embodiment, the first part of symbols are further used for automatic gain control.

In an embodiment, the time interval further includes a fourth part of symbols used to carry transmission information.

In an embodiment, the transmission information includes at least one piece of the following information: control information, data information, feedback information.

In an embodiment, there is a fifth part of symbols between the first part of symbols and the fourth part of symbols, the fifth part of symbols being used for a guard interval.

In an embodiment, the time interval further includes a sixth part of symbols used for performing automatic gain control, the sixth part of symbols being located in front of the fourth part of symbols, or former one or more symbols of the fourth part of symbols being taken as the sixth part of symbols.

In an embodiment, whether there exists a third part of symbols used for performing automatic gain control in front of the first part of symbols is determined according to a power control state or signaling related to power control received from a network device and/or a terminal equipment.

In an embodiment, according to a power control state or signaling related to power control received from a network device and/or a terminal equipment, whether there exists a sixth part of symbols used for performing automatic gain control in front of the fourth part of symbols is determined, or whether former one or more symbols of the fourth part of symbols are taken as a sixth part of symbols used for performing automatic gain control is determined.

In an embodiment, network device may transmit configuration information on a sidelink reference signal to a terminal equipment (the first device and/or the second device), and the terminal equipment determines the first part of symbols transmitting the sidelink reference signal according to the configuration information on a sidelink reference signal transmitted by the network device.

In an embodiment, network device may transmit configuration information on a slot format of a cellular link to the terminal equipment, and the terminal equipment determines the first part of symbols transmitting the sidelink reference signal according to the configuration information on a slot format of a cellular link transmitted by the network device.

In an embodiment, the first part of symbols of the sidelink reference signal corresponds to uplink symbols (U) and/or flexible symbols (F) in the cellular link.

The embodiments of this disclosure further provide a method for receiving a reference signal, including: determining by a second device a sidelink reference signal used for obtaining channel state information, wherein the sidelink reference signal is carried in a first part of symbols of a time interval; determining by the second device that the time interval is further used for transmitting or receiving transmission information; and determining by the second device that a part or all of time frequency resources transmitting the sidelink reference signal are used for transmitting or receiving the transmission information.

In an embodiment, the transmission information includes at least one of the following: unicast information, groupcast information, broadcast information, information transmitted to the network device, and information with a relatively high priority.

In an embodiment, the transmission information is transmitted or received on all resource blocks at the time interval, and transmission of the sidelink reference signal at the time interval is cancelled; or the transmission information is transmitted or received on a part of resource blocks at the time interval, and the sidelink reference signal is transmitted on other resources at the time interval.

The embodiments of this disclosure further provide a method for receiving a reference signal, including: determining by a second device a sidelink reference signal used for obtaining channel state information, wherein the sidelink reference signal is carried in a first part of symbols of a time interval; receiving, by the second device, scheduling information used for indicating transmission information; determining by the second device that a period from a moment of time of receiving the scheduling information to the sidelink reference signal is greater than a second threshold; and determining, by the second device, a part or all of time frequency resources receiving the sidelink reference signal as being used for transmitting or receiving the transmission information.

In an embodiment, the transmission information includes at least one of the following: unicast information, groupcast information, broadcast information, information transmitted to the network device, and information with a relatively high priority.

In an embodiment, the transmission information is transmitted or received on all resource blocks at the time interval, and reception of the sidelink reference signal at the time interval is cancelled; or the transmission information is transmitted or received on a part of resource blocks at the time interval, and the sidelink reference signal is received on other resources at the time interval.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the sidelink reference signal (hereinafter referred to as an XRS) used for obtaining CSI is carried in the first part of symbols of the time interval. Hence, measurement and reporting of the CSI may be supported in V2X, and different scenarios and different demands for services may be satisfied.

Embodiment 5

The embodiments of this disclosure provide an apparatus for transmitting a reference signal. The apparatus may be a terminal equipment, or may be one or more components or assemblies configured in a terminal equipment; however, this disclosure is not limited thereto; for example, it may also be a roadside device or a network device, or may be one or more components or assemblies configured in a roadside device or a network device. Contents in the embodiments identical to those in embodiments 1-3 shall not be described herein any further.

Figure 20:
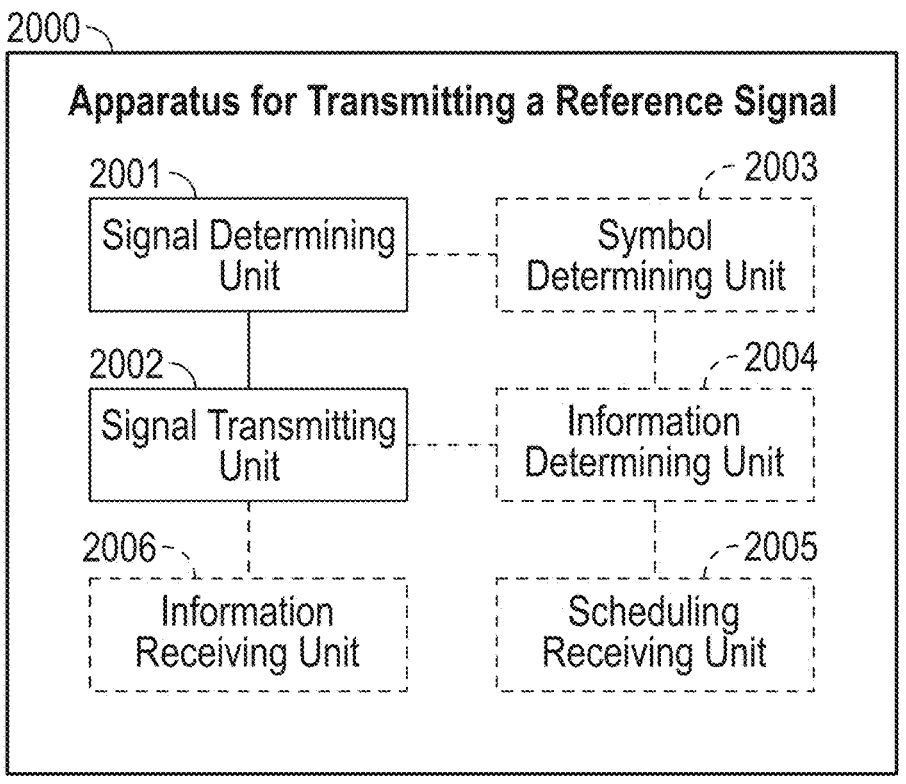
FIG. 20 is a schematic diagram of the apparatus for transmitting a reference signal of an embodiment of this disclosure.

FIG. 20 is a schematic diagram of the apparatus for transmitting a reference signal of an embodiment of this disclosure. As shown in FIG. 20, an apparatus 2000 for transmitting a reference signal includes:

a signal determining unit 2001 configured to determine a sidelink reference signal used for obtaining channel state information, wherein the sidelink reference signal is carried in a first part of symbols of a time interval; and a signal transmitting unit 2002 configured to transmit the sidelink reference signal to a second device.

In an embodiment, as shown in FIG. 20, the apparatus 2000 for transmitting a reference signal may further include:

a symbol determining unit 2003 configured to, according to a power control state or signaling related to power control received from a network device and/or a terminal equipment, determine whether there exists a third part of symbols used for performing automatic gain control in front of the first part of symbols, and/or according to a power control state or signaling related to power control received from a network device and/or a terminal equipment, determine whether there exists a sixth part of symbols used for performing automatic gain control in front of the fourth part of symbols, or determine whether former one or more symbols of the fourth part of symbols are taken as a sixth part of symbols used for performing automatic gain control.

In an embodiment, according to configuration information on a sidelink reference signal or configuration information on a slot format of a cellular link transmitted by a network device and/or a terminal equipment, the symbol determining unit may further determine the first part of symbols transmitting the sidelink reference signal.

In an embodiment, as shown in FIG. 20, the apparatus 2000 for transmitting a reference signal may further include:

an information determining unit 2004 configured to determine that the time interval is further used for transmitting or receiving transmission information;

and the signal determining unit 2001 is further configured to determine a part or all of time frequency resources transmitting the sidelink reference signal as being used for transmitting or receiving the transmission information.

In an embodiment, as shown in FIG. 20, the apparatus 2000 for transmitting a reference signal may further include:

a scheduling receiving unit 2005 configured to receive scheduling information used for indicating the transmission information;

and the information determining unit 2004 is further configured to determine that a period from a moment of time of receiving the scheduling information to the sidelink reference signal is greater than a second threshold; and the signal determining unit 2001 is further configured to determine a part or all of time frequency resources transmitting the sidelink reference signal as being used for transmitting or receiving the transmission information.

In an embodiment, as shown in FIG. 20, the apparatus 2000 for transmitting a reference signal may further include:

an information receiving unit 2006 configured to receive channel state information fed back by the second device, the channel state information being obtained by the second device according to channel measurement performed according to the sidelink reference signal.

It should be noted that the components or modules related to this disclosure are only described above. However, this disclosure is not limited thereto, and the apparatus 2000 for transmitting a reference signal may further include other components or modules, and reference may be made to related techniques for particulars of these components or modules.

Furthermore, for the sake of simplicity, connection relationships between the components or modules or signal profiles thereof are only illustrated in FIG. 20. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the sidelink reference signal (hereinafter referred to as an XRS) used for obtaining CSI is carried in the first part of symbols of the time interval. Hence, measurement and reporting of the CSI may be supported in V2X, and different scenarios and different demands for services may be satisfied.

Embodiment 6

The embodiments of this disclosure provide an apparatus for receiving a reference signal. The apparatus may be a terminal equipment, or may be one or more components or assemblies configured in a terminal equipment; however, this disclosure is not limited thereto; for example, it may also be a roadside device or a network device, or may be one or more components or assemblies configured in a roadside device or a network device. Contents in the embodiments identical to those in Embodiment 4 shall not be described herein any further.

Figure 21:
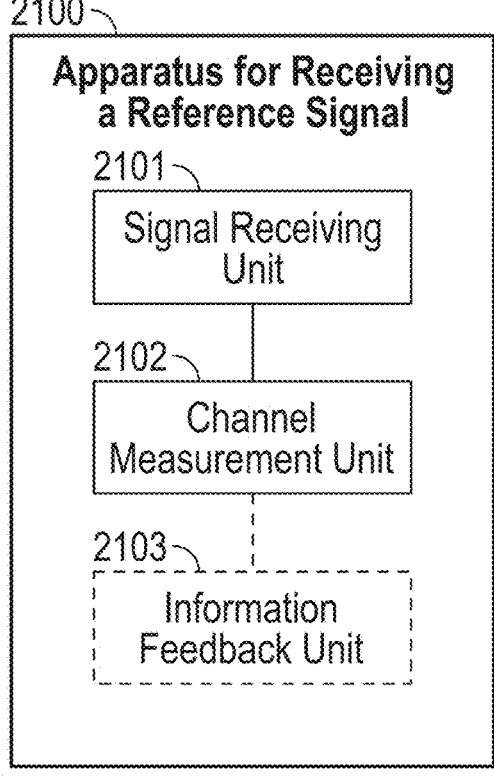
FIG. 21 is a schematic diagram of the apparatus for receiving a reference signal of an embodiment of this disclosure.

FIG. 21 is a schematic diagram of the apparatus for receiving a reference signal of an embodiment of this disclosure. As shown in FIG. 21, an apparatus 2100 for receiving a reference signal includes:

a signal receiving unit 2101 configured to receive a sidelink reference signal transmitted by a first device; wherein the sidelink reference signal is carried in a first part of symbols of a time interval; and a channel measuring unit 2102 configured to perform channel measurement according to the sidelink reference signal to obtain channel state information.

As shown in FIG. 21, the apparatus 2100 for receiving a reference signal may further include:

an information feedback unit 2103 configured to feed the channel state information back to the first device.

It should be noted that the components or modules related to this disclosure are only described above. However, this disclosure is not limited thereto, and the apparatus 2100 for receiving a reference signal may further include other components or modules, and reference may be made to related techniques for particulars of these components or modules.

Furthermore, for the sake of simplicity, connection relationships between the components or modules or signal profiles thereof are only illustrated in FIG. 21. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the sidelink reference signal (hereinafter referred to as an XRS) used for obtaining CSI is carried in the first part of symbols of the time interval. Hence, measurement and reporting of the CSI may be supported in V2X, and different scenarios and different demands for services may be satisfied.

Embodiment 7

The embodiments of this disclosure provide a communication system, and reference may be made to FIG. 1, with contents identical to those in embodiments 1-6 being not going to be described herein any further. In an embodiment, the communication system 100 may include:

a terminal equipment 102 or 103 configured with the apparatus 2000 for transmitting a reference signal as described in Embodiment 5 or the apparatus 2100 for receiving a reference signal as described in Embodiment 6; and a network device 101 configured to serve for the terminal equipment 102 or 103.

The embodiment of this disclosure further provides a network device, which may be, for example, a base station. However, this disclosure is not limited thereto, and it may also be another network device.

Figures 22, 23:
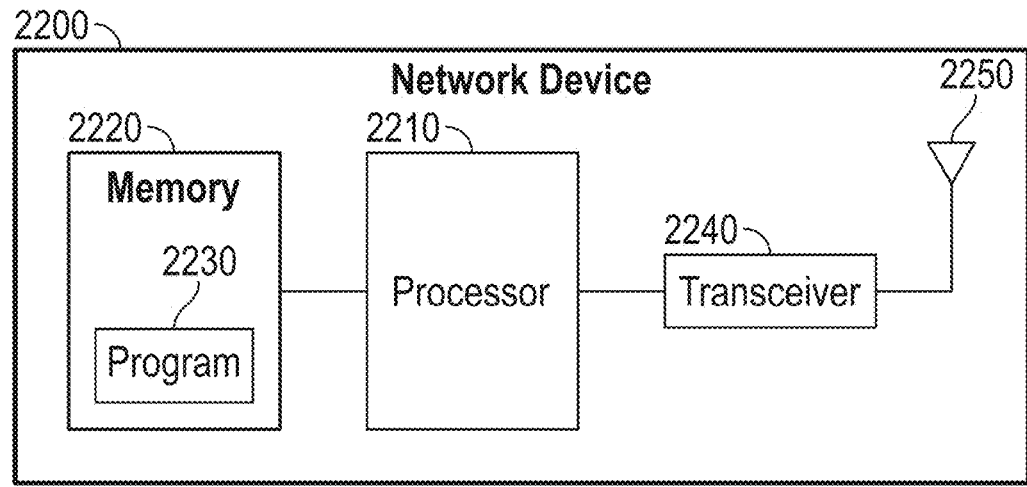
FIG. 22 is a schematic diagram of the network device of an embodiment of this disclosure.
FIG. 23 is a schematic diagram of the terminal equipment of an embodiment of this disclosure.

FIG. 22 is a schematic diagram of a structure of the network device of the embodiment of this disclosure. As shown in FIG. 22, the network device 2200 may include a processor 2210 (such as a central processing unit (CPU)) and a memory 2220, the memory 2220 being coupled to the processor 2210. The memory 2220 may store various data, and furthermore, it may store a program 2230 for data processing, and execute the program 2230 under control of the processor 2210.

Furthermore, as shown in FIG. 22, the network device 2200 may include a transceiver 2240, and an antenna 2250, etc. Functions of the above components are similar to those in the relevant art, and shall not be described herein any further. It should be noted that the network device 2200 does not necessarily include all the parts shown in FIG. 22, and furthermore, the network device 2200 may include parts not shown in FIG. 22, and the relevant art may be referred to.

The embodiment of this disclosure further provides a terminal equipment, however, this disclosure is not limited thereto, and it may also be another equipment.

FIG. 23 is a schematic diagram of the terminal equipment of the embodiment of this disclosure. As shown in FIG. 23, the terminal equipment 2300 may include a processor 2310 and a memory 2320, the memory 2320 storing data and a program and being coupled to the processor 2310. It should be noted that this figure is illustrative only, and other types of structures may also be used, so as to supplement or replace this structure and achieve a telecommunications function or other functions.

For example, the processor 2310 may be configured to execute a program to carry out the methods for transmitting a reference signal as described in embodiments 1-3. For example, the processor 2310 may be configured to execute the following control: determining a sidelink reference signal used for obtaining channel state information, wherein the sidelink reference signal is carried in a first part of symbols; and transmitting the sidelink reference signal to a second device.

For another example, the processor 2310 may be configured to execute the program to carry out the method for receiving a reference signal described in Embodiment 4. For example, the processor 2310 may be configured to execute the following control: receiving a sidelink reference signal transmitted by a first device, wherein the sidelink reference signal is carried in a first part of symbols of a time interval; and performing channel measurement according to the sidelink reference signal to obtain channel state information.

As shown in FIG. 23, the terminal equipment 2300 may further include a communication module 2330, an input unit 2340, a display 2350, and a power supply 2360; wherein functions of the above components are similar to those in the relevant art, which shall not be described herein any further. It should be noted that the terminal equipment 2300 does not necessarily include all the parts shown in FIG. 23, and the above components are not necessary. Furthermore, the terminal equipment 2300 may include parts not shown in FIG. 23, and the relevant art may be referred to.

An embodiment of the present disclosure provides a computer readable program code, which, when executed in a terminal equipment, will cause the terminal equipment to carry out the methods for transmitting a reference signal as described in embodiments 1-3 or the method for receiving a reference signal as described in Embodiment 4.

An embodiment of this disclosure provides a computer storage medium, including a computer readable program code, which will cause a terminal equipment to carry out the methods for transmitting a reference signal as described in embodiments 1-3 or the method for receiving a reference signal as described in Embodiment 4.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for transmitting a reference signal, including:

determining by a first device a sidelink reference signal used for obtaining CSI, wherein the sidelink reference signal is carried in a first part of symbols (one or more) of a time interval.

Supplement 2. The method according to supplement 1, wherein the method further includes:

transmitting the sidelink reference signal by the first device to a second device.

Supplement 3. The method according to supplement 2, wherein the method further includes:

receive, by the first device, channel state information fed back by the second device, the channel state information being obtained by the second device according to channel measurement performed according to the sidelink reference signal.

Supplement 4. The method according to any one of supplements 1-3, wherein the time interval includes at least one of the following: a slot, a subframe, a frame, a non-slot, and a mini-slot.

Supplement 5. The method according to any one of supplements 1-4, wherein the time interval further includes a second part of symbols used for a guard interval.

Supplement 6. The method according to supplement 5, wherein the second part of symbols are located after the first part of symbols carrying the sidelink reference signal, and the first part of symbols and the second part of symbols are located at a rear part of the time interval.

Supplement 7. The method according to any one of supplements 1-6, wherein the time interval further includes a third part of symbols used for performing automatic gain control, the third part of symbols being located in front of the first part of symbols carrying the sidelink reference signal.

Supplement 8. The method according to any one of supplements 1-5, wherein the first part of symbols is located at a front part of the time interval.

Supplement 9. The method according to any one of supplements 1-5 and 8, wherein the first part of symbols is further used for performing automatic gain control.

Supplement 10. The method according to any one of supplements 1-9, wherein the time interval further includes a fourth part of symbols used for carrying transmission information.

Supplement 11. The method according to supplement 10, wherein the transmission information includes at least one piece of the following information: control information, data information, and feedback information.

Supplement 12. The method according to supplement 10 or 11, wherein there is a fifth part of symbols used for a guard interval between the first part of symbols and the fourth part of symbols.

Supplement 13. The method according to any one of supplements 10-12, wherein the time interval further includes a sixth part of symbols used for performing automatic gain control, the sixth part of symbols being located in front of the fourth part of symbols, or former one or more symbols of the fourth part of symbols being taken as the sixth part of symbols.

Supplement 14. The method according to any one of supplements 1-13, wherein the method further includes:

according to a power control state or signaling related to power control received from a network device and/or a terminal equipment, determining by the first device whether there exists a third part of symbols used for performing automatic gain control in front of the first part of symbols.

Supplement 15. The method according to any one of supplements 10-13, wherein the method further includes:

according to a power control state or signaling related to power control received from a network device and/or a terminal equipment, determining whether there exists a sixth part of symbols used for performing automatic gain control in front of the fourth part of symbols, or determining whether former one or more symbols of the fourth part of symbols are taken as a sixth part of symbols used for performing automatic gain control, by the first device.

Supplement 16. The method according to any one of supplements 1-15, wherein the method further includes:

according to configuration information on a sidelink reference signal or configuration information on a slot format of a cellular link transmitted by a network device and/or a terminal equipment, determining by the first device the first part of symbols transmitting the sidelink reference signal.

Supplement 17. The method according to any one of supplements 1-15, wherein the method further includes:

receiving, by the first device, slot format configuration information of the cellular link transmitted by the network device and/or the terminal equipment; and determining the first part of symbols transmitting the sidelink reference signal by the first device according to the slot format configuration information of the cellular link.

Supplement 18. The method according to supplement 16 or 17, wherein the first part of symbols of the sidelink reference signal correspond to uplink (U) symbols and/or flexible (F) symbols in the cellular link.

Supplement 19. The method according to any one of supplements 1-18, wherein the first part of symbols is further used for carrying feedback information.

Supplement 20. The method according to supplement 19, wherein the feedback information includes at least one of the following: hybrid automatic repeat request acknowledgment information (HARQ-ACK), channel state information (CSI), a modulation and coding scheme (MCS), a channel quality indicator (CQI), a precoding matrix indicator (PMI), a rank indicator (RI), and beam information.

Supplement 21. The method according to any one of supplements 1-20, wherein the method further includes:

determining by the first device that the time interval is further used for transmitting or receiving transmission information; and determining by the first device a part or all of time frequency resources transmitting the sidelink reference signal as being used for transmitting or receiving the transmission information.

Supplement 22. The method according to supplement 21, wherein the first device is further configured to determine whether a priority of the transmission information is higher than a first threshold, and when the priority of the transmission information is higher than the first threshold, determine a part or all of time frequency resources transmitting the sidelink reference signal as being used for transmitting or receiving the transmission information.

Supplement 23. The method according to supplement 21, wherein the method further includes:

receiving scheduling information used for indicating the transmission information by the first device; and determining by the first device whether a period from a moment of time of receiving the scheduling information to the sidelink reference signal is greater than a second threshold, and when the period from a moment of time of receiving the scheduling information to the sidelink reference signal is greater than the second threshold, determining a part or all of time frequency resources transmitting the sidelink reference signal as being used for transmitting or receiving the transmission information.

Supplement 24. The method according to supplement 21, wherein the method further includes:

determining whether a priority of the transmission information is higher than a first threshold, and determining whether a period from a moment of time of receiving the scheduling information to the sidelink reference signal is greater than a second threshold, by the first device; and when the priority of the transmission information is higher than the first threshold and the period from a moment of time of receiving the scheduling information to the sidelink reference signal is greater than the second threshold, determining a part or all of time frequency resources transmitting the sidelink reference signal as being used for transmitting or receiving the transmission information.

Supplement 25. The method according to any one of supplements 21-24, wherein the transmission information includes at least one piece of the following information: unicast information, groupcast information, broadcast information, information transmitted to a network device, and information having a higher priority.

Supplement 26. The method according to any one of supplements 21-25, wherein the transmission information is transmitted or received on all resource blocks at the time interval, and transmission of the sidelink reference signal at the time interval is cancelled; or the transmission information is transmitted or received on a part of resource blocks at the time interval, and the sidelink reference signal is transmitted on other resources at the time interval.

Supplement 27. A method for transmitting a reference signal, including:

determining, by a first device, a sidelink reference signal used for obtaining channel state information; wherein the sidelink reference signal is carried in a first part of symbols of a time interval;

determining by the first device that the time interval is further used for transmitting or receiving transmission information; and determining, by the first device, a part or all of time frequency resources transmitting the sidelink reference signal as being used for transmitting or receiving the transmission information.

Supplement 28. The method according to supplement 27, wherein the first device is further configured to, when a priority of the transmission information is higher than a first threshold, determine a part or all of time frequency resources transmitting the sidelink reference signal as being used for transmitting or receiving the transmission information.

Supplement 29. The method according to supplement 27 or 28, wherein the transmission information includes at least one piece of the following information: unicast information, groupcast information, broadcast information, information transmitted to a network device, and information having a higher priority.

Supplement 30. The method according to any one of supplements 27-29, wherein the transmission information is transmitted or received on all resource blocks at the time interval, and transmission of the sidelink reference signal at the time interval is cancelled; or the transmission information is transmitted or received on a part of resource blocks at the time interval, and the sidelink reference signal is transmitted on other resources at the time interval.

Supplement 31. A method for transmitting a reference signal, including:

determining, by a first device, a sidelink reference signal used for obtaining channel state information; wherein the sidelink reference signal is carried in a first part of symbols of a time interval;

receiving, by the first device, scheduling information used for indicating transmission information;

determining by the first device that a period from a moment of time of receiving the scheduling information to the sidelink reference signal is greater than a second threshold; and determining, by the first device, a part or all of time frequency resources transmitting the sidelink reference signal as being used for transmitting or receiving the transmission information.

Supplement 32. The method according to supplement 31, wherein the transmission information includes at least one piece of the following information: unicast information, groupcast information, broadcast information, information transmitted to a network device, and information having a higher priority.

Supplement 33. The method according to supplement 31 or 32, wherein the transmission information is transmitted or received on all resource blocks at the time interval, and transmission of the sidelink reference signal at the time interval is cancelled; or the transmission information is transmitted or received on a part of resource blocks at the time interval, and the sidelink reference signal is transmitted on other resources at the time interval.

Supplement 34. A method for receiving a reference signal, including:

receiving, by a second device, a sidelink reference signal transmitted by a first device; wherein the sidelink reference signal is carried in a first part of symbols of a time interval; and performing channel measurement by the second device according to the sidelink reference signal to obtain channel state information.

Supplement 35. The method according to supplement 34, wherein the method further includes:

feeding back the channel state information by the second device to the first device.

Supplement 36. The method according to supplement 34 or 35, wherein the time interval includes at least one of the following: a slot, a subframe, a frame, a non-slot, and a mini-slot.

Supplement 37. The method according to any one of supplements 34-36, wherein the time interval further includes a second part of symbols used for a guard interval.

Supplement 38. The method according to supplement 37, wherein the second part of symbols are located after the first part of symbols carrying the sidelink reference signal, and the first part of symbols and the second part of symbols are located at a rear part of the time interval.

Supplement 39. The method according to any one of supplements 34-38, wherein the time interval further includes a third part of symbols used for performing automatic gain control, the third part of symbols being located in front of the first part of symbols carrying the sidelink reference signal.

Supplement 40. The method according to any one of supplements 34-37, wherein the first part of symbols is located at a front part of the time interval.

Supplement 41. The method according to any one of supplements 34-38 and 40, wherein the first part of symbols is further used for performing automatic gain control.

Supplement 42. The method according to any one of supplements 34-41, wherein the time interval further includes a fourth part of symbols used for carrying transmission information.

Supplement 43. The method according to supplement 42, wherein the transmission information includes at least one piece of the following information: control information, data information, and feedback information.

Supplement 44. The method according to supplement 42 or 43, wherein there is a fifth part of symbols used for a guard interval between the first part of symbols and the fourth part of symbols.

Supplement 45. The method according to any one of supplements 42-44, wherein the time interval further includes a sixth part of symbols used for performing automatic gain control, the sixth part of symbols being located in front of the fourth part of symbols, or former one or more symbols of the fourth part of symbols being taken as the sixth part of symbols.

Supplement 46. The method according to any one of supplements 34-45, wherein whether there exists a third part of symbols used for performing automatic gain control in front of the first part of symbols is determined according to a power control state or signaling related to power control received from a network device and/or a terminal equipment.

Supplement 47. The method according to any one of supplements 34-45, wherein whether there exists a sixth part of symbols used for performing automatic gain control in front of the fourth part of symbols according to a power control state or signaling related to power control received from a network device and/or a terminal equipment.

Supplement 48. The method according to any one of supplements 34-45, wherein the method further includes:

according to configuration information on a sidelink reference signal transmitted by a network device and/or a terminal equipment, determining by the second device the first part of symbols transmitting the sidelink reference signal; and transmitting information on the first part of symbols by the second device to the first device transmitting the sidelink reference signal.

Supplement 49. The method according to any one of supplements 34-45, wherein the method further includes:

according to configuration information on a slot format of a cellular link transmitted by a network device and/or a terminal equipment, determining by the second device the first part of symbols transmitting the sidelink reference signal; and transmitting information on the first part of symbols by the second device to the first device transmitting the sidelink reference signal.

Supplement 50. The method according to supplement 48 or 49, wherein the first part of symbols of the sidelink reference signal correspond to uplink (U) symbols and/or flexible (F) symbols in the cellular link.

Supplement 51. The method according to any one of supplements 34-50, wherein the first part of symbols is further used for carrying feedback information.

Supplement 52. The method according to supplement 51, wherein the feedback information includes at least one of the following: hybrid automatic repeat request acknowledgment information (HARQ-ACK), channel state information (CSI), a modulation and coding scheme (MCS), a channel quality indicator (CQI), a precoding matrix indicator (PMI), a rank indicator (RI), and beam information.

Supplement 53. The method according to any one of supplements 34-52, wherein the method further includes:
determining by the second device that the time interval is further used for transmitting or receiving transmission information; and
determining by the second device a part or all of time frequency resources transmitting the sidelink reference signal as being used for transmitting or receiving the transmission information.

Supplement 54. The method according to supplement 53, wherein the second device is further configured to determine whether a priority of the transmission information is higher than a first threshold, and when the priority of the transmission information is higher than the first threshold, determine a part or all of time frequency resources transmitting the sidelink reference signal as being used for transmitting or receiving the transmission information.

Supplement 55. The method according to supplement 53, wherein the method further includes:
receiving scheduling information used for indicating the transmission information by the second device; and
determining by the second device whether a period from a moment of time of receiving the scheduling information to the sidelink reference signal is greater than a second threshold, and when the period from a moment of time of receiving the scheduling information to the sidelink reference signal is greater than the second threshold, determining a part or all of time frequency resources transmitting the sidelink reference signal as being used for transmitting or receiving the transmission information.

Supplement 56. The method according to supplement 53, wherein the method further includes:
determining whether a priority of the transmission information is higher than a first threshold, and determining whether a period from a moment of time of receiving the scheduling information to the sidelink reference signal is greater than a second threshold, by the second device; and
when the priority of the transmission information is higher than the first threshold and the period from a moment of time of receiving the scheduling information to the sidelink reference signal is greater than the second threshold, determining a part or all of time frequency resources transmitting the sidelink reference signal as being used for transmitting or receiving the transmission information.

Supplement 57. The method according to any one of supplements 53-56, wherein the transmission information includes at least one piece of the following information: unicast information, groupcast information, broadcast information, information transmitted to a network device, and information having a higher priority.

Supplement 58. The method according to any one of supplements 53-57, wherein the transmission information is transmitted or received on all resource blocks at the time interval, and transmission of the sidelink reference signal at the time interval is cancelled; or
the transmission information is transmitted or received on a part of resource blocks at the time interval, and the sidelink reference signal is transmitted on other resources at the time interval.

Supplement 59. A method for receiving a reference signal, including:
determining, by a second device, a sidelink reference signal used for obtaining channel state information; wherein the sidelink reference signal is carried in a first part of symbols of a time interval;
determining by the second device that the time interval is further used for transmitting or receiving transmission information; and
determining by the second device a part or all of time frequency resources transmitting the sidelink reference signal as being used for transmitting or receiving the transmission information.

Supplement 60. The method according to supplement 59, wherein when a priority of the transmission information is higher than a first threshold, the second device determines a part or all of time frequency resources transmitting the sidelink reference signal as being used for transmitting or receiving the transmission information.

Supplement 61. The method according to supplement 59 or 60, wherein the transmission information includes at least one piece of the following information: unicast information, groupcast information, broadcast information, information transmitted to a network device, and information having a higher priority.

Supplement 62. The method according to any one of supplements 59-61, wherein the transmission information is transmitted or received on all resource blocks at the time interval, and transmission of the sidelink reference signal at the time interval is cancelled; or
the transmission information is transmitted or received on a part of resource blocks at the time interval, and the sidelink reference signal is received on other resources at the time interval.

Supplement 63. A method for receiving a reference signal, including:
determining, by a second device, a sidelink reference signal used for obtaining channel state information; wherein the sidelink reference signal is carried in a first part of symbols of a time interval;
receiving, by the second device, scheduling information used for indicating transmission information;
determining by the second device that a period from a moment of time of receiving the scheduling information to the sidelink reference signal is greater than a second threshold; and
determining, by the second device, a part or all of time frequency resources receiving the sidelink reference signal as being used for transmitting or receiving the transmission information.

Supplement 64. The method according to supplement 63, wherein the transmission information includes at least one piece of the following information: unicast information, groupcast information, broadcast information, information transmitted to a network device, and information having a higher priority.

Supplement 65. The method according to supplement 63 or 64, wherein the transmission information is transmitted or received on all resource blocks at the time interval, and transmission of the sidelink reference signal at the time interval is cancelled; or the transmission information is transmitted or received on a part of resource blocks at the time interval, and the sidelink reference signal is received on other resources at the time interval.

Supplement 66. A terminal equipment, including a memory and a processor, the memory storing a computer program, and the processor being configured to execute the computer program to carry out the method transmitting a reference signal as described in any one of supplements 1-33 or the method receiving a reference signal as described in any one of supplements 34-65.

What is claimed is:

1. An apparatus for transmitting HARQ-ACK (Hybrid Automatic Repeat Request-Acknowledge) signal, comprising:

a memory that stores a plurality of instructions; and processor circuitry coupled to the memory and configured to execute the instructions to:

determine a sidelink HARQ-ACK signal, wherein the sidelink HARQ-ACK signal is carried in a first part of symbols of a time interval, wherein the time interval further comprises:

a second part of symbols configured as a guard interval, the second part of symbols being located after the first part of symbols carrying the sidelink HARQ-ACK signal, and the first part of symbols and the second part of symbols being located at a rear part of the time interval;

a third part of symbols configured to perform automatic gain control, the third part of symbols being located in front of the first part of symbols carrying the sidelink HARQ-ACK signal, or one or more symbols in front of the first part of symbols being taken as the third part of symbols;

a fourth part of symbols configured to carry transmission information; wherein the transmission information comprises at least one piece of the following information: control information, data information, or feedback information;

a fifth part of symbols being located between the third part of symbols and the fourth part of symbols, the fifth part of symbols configured as a guard interval; and a sixth part of symbols, the sixth part of symbols being located in front of the fourth part of symbols, or one or more symbols in front of the fourth part of symbols being taken as the sixth part of symbols, and transmit the sidelink HARQ-ACK signal to a second device.

2. The apparatus according to claim 1, wherein the time interval comprises at least one of the following: a slot, a subframe, a frame, a non-slot, and a mini-slot.

3. The apparatus according to claim 1, wherein the first part of symbols is located at a front part of the time interval, and is further configured to perform automatic gain control.

4. The apparatus according to claim 1, wherein the transmission information comprises control information, data information and CSI-RS (Channel State Information Reference Signal).

5. The apparatus according to claim 1, wherein the processor circuitry is further configured to, according to a power control state or signaling related to power control, determine whether there exists the third part of symbols in front of the first part of symbols, or determine whether one or more symbols in front of the first part of symbols are taken as a third part of symbols.

6. The apparatus according to claim 5, wherein the power control state and the signaling related to power control are received from a network device and/or a terminal equipment.

7. The apparatus according to claim 1, wherein the processor circuitry is further configured to, according to a power control state or signaling related to power control, determine whether there exists a sixth part of symbols in front of the fourth part of symbols, or determine whether one or more symbols in front of the fourth part of symbols are taken as a sixth part of symbols.

8. The apparatus according to claim 1, wherein the processor circuitry is further configured to, according to configuration information on a sidelink HARQ-ACK signal or configuration information on a slot format of a cellular link, determine the first part of symbols transmitting the sidelink HARQ-ACK signal.

9. The apparatus according to claim 8, wherein the first part of symbols of the sidelink HARQ-ACK signal corresponds to at least one of uplink symbols and flexible symbols in the cellular link.

10. The apparatus according to claim 8, wherein the configuration information on a sidelink HARQ-ACK signal and the configuration information on a slot format of a cellular link are transmitted by a network device and/or a terminal equipment.

11. The apparatus according to claim 1, wherein the processor circuitry is further configured to determine that the time interval is further configured to transmit or to receive the transmission information; and determine a part or all of time frequency resources transmitting the sidelink HARQ-ACK signal as being configured to transmit or to receive the transmission information.

12. The apparatus according to claim 11, wherein the processor circuitry is further configured to determine that a priority of the transmission information is higher than a first threshold; and the signal determining unit is further configured to, when the priority of the transmission information is higher than the first threshold, determine a part or all of time frequency resources transmitting the sidelink HARQ-ACK signal as being configured to transmit or to receive the transmission information.

13. The apparatus according to claim 11, wherein the transmission information comprises at least one piece of the following information: unicast information, groupcast information, broadcast information, information transmitted to a network device, and information having a higher priority.

14. The apparatus according to claim 11, wherein the transmission information is transmitted or received on all resource blocks at the time interval, and transmission of the sidelink HARQ-ACK signal at the time interval is cancelled.

15. The apparatus according to claim 11, wherein the processor circuitry is further configured to:

receive scheduling information configured to indicate the transmission information;

determine that a period from a moment of time of receiving the scheduling information to the sidelink HARQ-ACK signal is greater than a second threshold; and when the period from a moment of time of receiving the scheduling information to the sidelink HARQ-ACK signal is greater than the second threshold, determine a part or all of time frequency resources transmitting the sidelink HARQ-ACK signal as being configured to transmit or to receive the transmission information.

16. The apparatus according to claim 11, wherein the transmission information is transmitted or received on a part of resource blocks at the time interval, and the sidelink HARQ-ACK signal is transmitted on other resources at the time interval.

17. The apparatus according to claim 1, wherein the time interval is a slot.

18. An apparatus for receiving HARQ-ACK signal, comprising:

a memory that stores a plurality of instructions; and processor circuitry coupled to the memory and configured to execute the instructions to:

receive a sidelink HARQ-ACK signal transmitted by a first device; wherein the sidelink HARQ-ACK signal is carried in a first part of symbols of a time interval, wherein the time interval further comprises:

a second part of symbols configured as a guard interval, the second part of symbols being located after the first part of symbols carrying the sidelink HARQ-ACK signal, and the first part of symbols and the second part of symbols being located at a rear part of the time interval;

a third part of symbols configured to perform automatic gain control, the third part of symbols being located in front of the first part of symbols carrying the sidelink HARQ-ACK signal, or one or more symbols in front of the first part of symbols being taken as the third part of symbols;

a fourth part of symbols configured to carry transmission information; and wherein the transmission information comprises at least one piece of the following information: control information, data information, or feedback information;

a fifth part of symbols being located between the third part of symbols and the fourth part of symbols, the fifth part of symbols being configured as a guard interval; and a sixth part of symbols, the sixth part of symbols being located in front of the fourth part of symbols, or one or more symbols in front of the fourth part of symbols being taken as the sixth part of symbols.

19. The apparatus according to claim 18, wherein a channel status information based upon the sidelink HARQ-ACK signal is feedbacked to the processor circuitry.

20. A communication system, comprising:

a first device configured to determine a sidelink HARQ-ACK signal, wherein the sidelink HARQ-ACK signal is carried in a first part of symbols of a time interval; and transmit the sidelink HARQ-ACK signal to a second device; and a second device configured to receive the sidelink HARQ-ACK signal transmitted by the first device, wherein the time interval further comprises:

a second part of symbols configured as a guard interval, the second part of symbols being located after the first part of symbols carrying the sidelink HARQ-ACK signal, and the first part of symbols and the second part of symbols being located at a rear part of the time interval;

a third part of symbols configured to perform automatic gain control, the third part of symbols being located in front of the first part of symbols carrying the sidelink HARQ-ACK signal, or one or more symbols in front of the first part of symbols being taken as the third part of symbols;

a fourth part of symbols configured to carry transmission information; and wherein the transmission information comprises at least one piece of the following information: control information, data information, and feedback information;

a fifth part of symbols being located between the third part of symbols and the fourth part of symbols, the fifth part of symbols being configured as a guard interval; and a sixth part of symbols, the sixth part of symbols being located in front of the fourth part of symbols, or one or more symbols in front of the fourth part of symbols being taken as the sixth part of symbols.

\* \* \* \* \*